United States Patent
Helmling et al.

(10) Patent No.: US 12,073,503 B2
(45) Date of Patent: Aug. 27, 2024

(54) APPARATUS AND METHOD TO GENERATE AN ANIMATED GRAPHICAL OBJECT

(71) Applicants: Achim Helmling, The Hague (NL); Bas Jacobs, Amsterdam (NL); Sami Kortemäki, Helsinki (FI)

(72) Inventors: Achim Helmling, The Hague (NL); Bas Jacobs, Amsterdam (NL); Sami Kortemäki, Helsinki (FI)

(73) Assignees: Achim Helmling, The Hague (NL); Bas Jacobs, The Hague (NL); Sami Kortemäki, Helsinki (FI)

( * ) Notice: Subject to any disclaimer, the term of this patent is extended or adjusted under 35 U.S.C. 154(b) by 0 days.

(21) Appl. No.: 18/492,919

(22) Filed: Oct. 24, 2023

(65) Prior Publication Data
US 2024/0054713 A1 Feb. 15, 2024

Related U.S. Application Data

(63) Continuation of application No. PCT/NL2022/050218, filed on Apr. 22, 2022.

(51) Int. Cl.
*G06T 13/80* (2011.01)
*G06F 40/109* (2020.01)
*G06T 11/20* (2006.01)

(52) U.S. Cl.
CPC ........... *G06T 13/80* (2013.01); *G06F 40/109* (2020.01); *G06T 11/203* (2013.01)

(58) Field of Classification Search
CPC ......... G06F 40/109; G06T 1/20; G06T 13/00; G06T 13/80; G06T 11/203
(Continued)

(56) References Cited

U.S. PATENT DOCUMENTS 7,941,758 B2 * 5/2011 Tremblay ................ G06F 9/451
345/169
8,766,987 B2 7/2014 Pirchio
(Continued)

OTHER PUBLICATIONS

Yang et al., "Animating the Brush-writing Process of Chinese Calligraphy Characters", Computer and Information Science, 2009. ICIS 2009. Eighth IEEE/ACIS International Conference On, IEEE, Piscataway, NJ, USA, Jun. 2009 (Jun. 2009), pp. 683-688, XP031519339, ISBN: 978-0-7695-3641-5.
(Continued)

*Primary Examiner* — Jacinta M Crawford
(74) *Attorney, Agent, or Firm* — N.V. Nederlandsch Octrooibureau

(57) ABSTRACT

A computer-implemented method for animating a graphical object based on animation parameters, the graphical object comprising an element comprising a frame comprising a trajectory defining at least a part of the shape of the graphical object wherein the trajectory comprises a first side and a second side, and the frame comprises a plurality of pairs of points, each pair comprising a first point on the first side of the trajectory and a second point on the second side of the trajectory. The method comprises receiving, a request to animate a graphical object in a design space based on one or more animation parameters; and determining an animation path for the frame in the design space by determining a moving path from a first pair of the plurality of pairs of points to a second pair; and displaying the animation path on a display.

20 Claims, 24 Drawing Sheets

(58) Field of Classification Search
USPC .......................................................... 345/473
See application file for complete search history.

(56) References Cited

U.S. PATENT DOCUMENTS

| | | |
|---|---|---|
| 9,727,997 B2 | 8/2017 | Lee |
| 10,997,770 B1* | 5/2021 | Kumawat ............. G06F 40/109 |
| 2018/0253883 A1* | 9/2018 | Shanbhag ............. G06F 40/109 |

OTHER PUBLICATIONS

Kumawat Nirmal Kumawat@Adobe Com: "Automated Physics Based Animation of Fonts", ACM SIGGRAPH 2020 Posters, ACMPUB27, New York, NY, USA, Aug. 17, 2020 (Aug. 17, 2020), pp. 1-2, XP058474788, DOI: 10.1145/3388770.3407434. ISBN: 978-1-4503-7973-1.

Mayr et al: "Spatio-Temporal Handwriting Imitation", arxiv.org, Cornell University Library, 201 OLIN Library Cornell University Ithaca, NY 14853, Apr. 16, 2021 (Apr. 16, 2021), XP081923231, DOI: 10.1007/978-3-030-68238-5_38.

\* cited by examiner

APPARATUS AND METHOD TO GENERATE AN ANIMATED GRAPHICAL OBJECT

TECHNICAL FIELD

The invention relates to an apparatus to generate an animated graphical object. The invention also relates to a method to generate an animated graphical object.

BACKGROUND

The visual appearance of glyphs are defined by fonts having a design space for the glyphs based on the typically been static two dimensional (2D) definitions, or more recently 2D definitions with pre-defined animations. Font files, such as Calibri or Arial, are generally used to define the appearance of text. Traditionally, when an application instances a font at a determined size, such as for instance Calibri 10, all the font data generated is usually shareable with other applications requesting the same font because intermediate results are cached.

Animations are typically animated at 60 frames per second. That means that an application animating a graphical object needs to create a large number of instances of said graphical object. Also the probability of other applications reusing animated graphical objects is low. This results in a waste of memory space. Also perfectly shareable instances of graphical objects are evited from memory due to the large number of instances of the graphical object that need to be created for each animation.

Therefore, existing techniques to animate graphical objects either use large amounts of memory space to store all the intermediate data or require high frame-over-frame processing time. For instance, the animated graphics interchange format (GIF) requires repeated rendering of different image content thereby using significant processing time to decode each image frame and significant storage space to store the image frames.

Thus, there is a need in the art to improve the animation of graphical objects.

SUMMARY

The following presents a simplified and not an extensive summary of one or more implementations of the present disclosure to provide basic understanding of said implementations and it is not intended to limit the scope of protection.

One example implementation relates to a computer device for animating a graphical object based on animation parameters wherein the graphical object may comprise at least one element wherein the at least one element may comprise at least one frame wherein the at least one frame may comprise a trajectory defining at least a part of the shape of the graphical object wherein the trajectory may comprise a first side and a second side, and the at least one frame may comprise a plurality of pairs of points where each pair of points may comprise a first point located on the first side of the trajectory and a second point located on the second side of the trajectory. The computer device may include a memory to store data and instructions, a processor to communicate with the memory, a display and an operating system to communicate with the memory and the processor, wherein the operating system is operable to receive a request to animate a graphical object in a design space based on one or more animation parameters, determine an animation path for the frame in the design space by determining a moving path from a first pair of the plurality of pairs of points of the frame to a second pair of the plurality of pairs of points of the frame wherein the first and second points of the second pair are respectively neighbours of the first and second points of the first pair of points and display the animation path on the display.

Another example implementation relates to a method for animating a graphical object based on animation parameters, wherein the graphical object may comprise at least one element wherein the at least one element may comprise at least one frame wherein the at least one frame may comprise a trajectory defining at least a part of the shape of the graphical object wherein the trajectory may comprise a first side and a second side, and the at least one frame may comprise a plurality of pairs of points where each pair of points may comprise a first point located on the first side of the trajectory and a second point located on the second side of the trajectory, and wherein animating the graphical object may comprises receiving, at an operating system executing on a computer device, a request to animate a graphical object in a design space based on one or more animation parameters, determining, at the operating system, an animation path for the frame in the design space by determining a moving path from a first pair of the plurality of pairs of points of the frame to a second pair of the plurality of pairs of points of the frame wherein the first and second points of the second pair are respectively neighbours of the first and second points of the first pair of points, and displaying the animation path on a display device.

Another example implementation relates to non-transitory computer-readable medium storing instructions for animating a graphical object based on animation parameters, wherein the graphical object may comprise at least one element wherein the at least one element may comprise at least one frame wherein the at least one frame may comprise a trajectory defining at least a part of the shape of the graphical object wherein the trajectory may comprise a first side and a second side, and the at least one frame may comprise a plurality of pairs of points where each pair of points may comprise a first point located on the first side of the trajectory and a second point located on the second side of the trajectory, and instructions being executable by a computer device wherein the instructions may comprise at least one instruction for causing the computer device to receive a request to animate a graphical object in a design space based on one or more animation parameters, at least one instruction for causing the computer device to determine an animation path for the frame in the design space by determining a moving path from a first pair of the plurality of pairs of points of the frame to a second pair of the plurality of pairs of points of the frame wherein the first and second points of the second pair are respectively neighbours of the first and second points of the first pair of points, and at least one instruction for causing the computer device to display the animation path.

Additional novel features and advantages will be described and explained in the description that follows.

BRIEF DESCRIPTION OF THE DRAWINGS

In the following, aspects of the invention will be elucidated by means of examples, with reference to the drawings. The drawings are diagrammatic and are not drawn to scale.

FIGS. 10A-10E illustrate an example of an artificial high order interpolation.

DESCRIPTION

Figure 1:
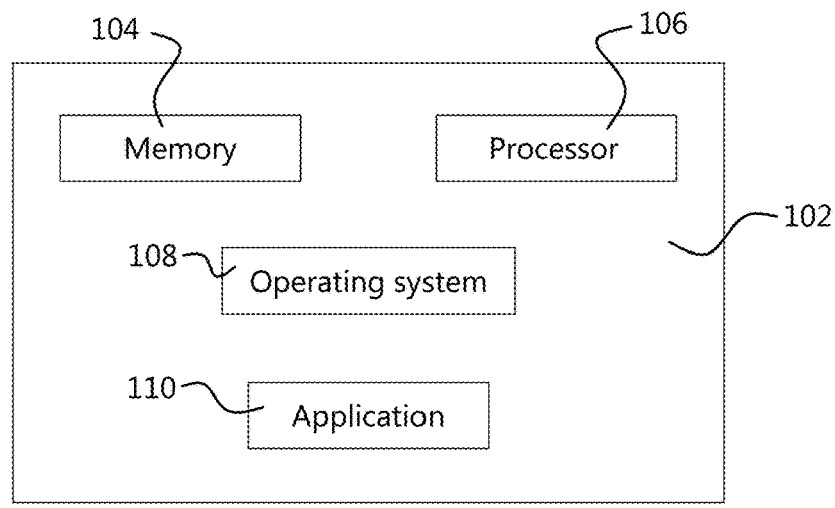
FIG. 1 is a schematic block diagram of an example device according to an implementation of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first element may be referred to as a second element without departing from the scope the present invention, and similarly, a second element may be referred to as a first element.

The terms used in describing the various embodiments of the present disclosure are for the purpose of describing particular embodiments and are not intended to limit the present disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

For the purpose of determining the extent of protection conferred by the claims of this document, due account shall be taken of any element which is equivalent to an element specified in the claims.

The present disclosure provides systems and methods for creating, presenting or displaying animations of graphical objects. Graphical objects may be animated according to one or more animation parameters which may define one or more animation axes wherein each animation axe corresponds to the variation of one animation parameter for said graphical object. Each animation axe may define a range of possible values for an animation parameter between a maximum value and a minimum value.

FIG. 1, illustrates an example of a computer device 102 for animating a graphic object. The computer device 102 may comprise a memory 104 and a processor 106. The computer device may be mobile or fix and may be connectable to a network. The computer device may be, for instance, a desktop, a laptop, a mobile phone, a tablet, a television, a videogame device, a music device, a camera or any other computer device. The computer device 102 may comprise an operating system 108 that may be executed by the processor 106. The memory 104 may be configured to store data and/or computer instructions related to the operating system 108. Non-limiting examples of memories are any kind of memory that can be used by a computer such for instance a random access memory (RAM), a read only memory (ROM), volatile or non-volatile memories, magnetic and/or optical discs and any combination of any of them. Non-limiting examples of processors are any processor programed to perform any of the methods described herein, such as a controller, microcontroller, system on chip (SOC), field programmable gate array (FPGA), application specific integrated circuit (ASIC), or any other programmable logic device. The computer device may include as well one or more applications 110 that may animate and/or display a graphic object on a display.

Figure 2A:
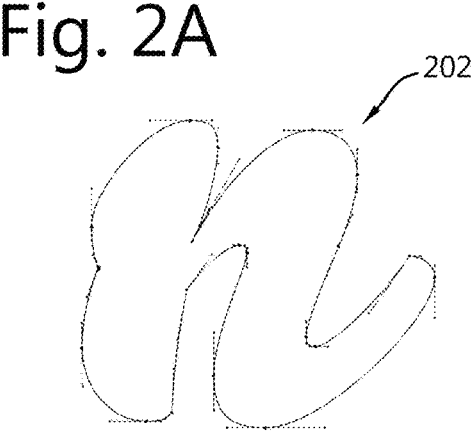
FIGS. 2A-2D illustrate an example of glyph data comprising strokes according to an implementation of the present disclosure.
Figure 2B:
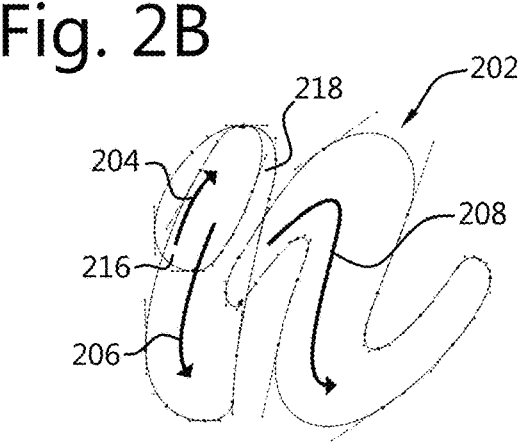
Figure 2C:
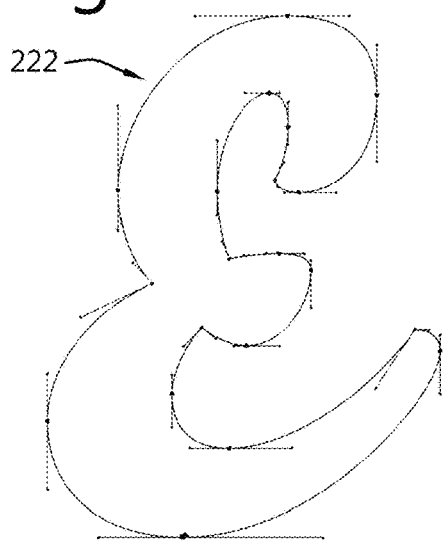

FIGS. 2A and 2B illustrate an example of an "n" glyph 202 which in FIG. 2B is divided into strokes. To animate graphical objects, a different design and approach than for static graphical objects is needed. For static graphical objects only the final form of the graphical object is displayed and the constructions remains not visible. However, for animated graphical objects the construction is also displayed because the graphical objects exist within a dynamic environment. Therefore, the design approach needs to take this into account. In this way, a graphical object, which may be a glyph, a pictogram icon or any other vector-based drawing, may comprise at least one element which may be a stroke. The at least one element may comprises at least one frame wherein the at least one frame may comprise a trajectory or contour defining at least a part of the shape of the graphical object wherein the trajectory or contour may comprise a first side and a second side, and the at least one frame may comprise a plurality of pairs of points where each pair of points may comprise a first point located on the first side of the trajectory or contour and a second point located on the second side of the trajectory or contour. Dividing the graphical objects in strokes will be described in relation to FIGS. 2A-2D. FIG. 2B illustrates how the glyph 202 is divided in three strokes, namely a first stroke 204, a second stroke 206 and a third stroke 208. A graphical object may be divided in any number of elements or strokes. The division of the glyph 202 in strokes may be done by taking into account how the "n" glyph 202 would usually be handwritten. Each of the first stroke 204, the second stroke 206 and the third stroke 208 respectively may comprise a first direction 210, a second direction 212 and a third direction 214, which may indicate the direction on which each of the strokes should be animated. The first direction, the second direction and the third direction may be based on the way a glyph is handwritten. I.e., regarding the "n" glyph 202 shown in FIGS. 2A and 2B, a person handwritten said glyph would usually handwrite first the first stroke 204, then the second stroke 2 and finally the third stroke 208. The person would handwrite the first stroke 204 by starting with the pen on the lowest part 216 of the first stroke 204 and moving then the pen towards the upper part 218 of the first stroke 204 following the first direction 204. The second stroke 206 will be then written starting from the upper part of the second stroke 206 and following the second direction 212 towards the lowest part of the second stroke 206. Finally, the third stroke 208 will be written starting from the left part of the third stroke 208 and following the third direction 214 towards the lowest part of the third stroke 208.

Figure 2D:
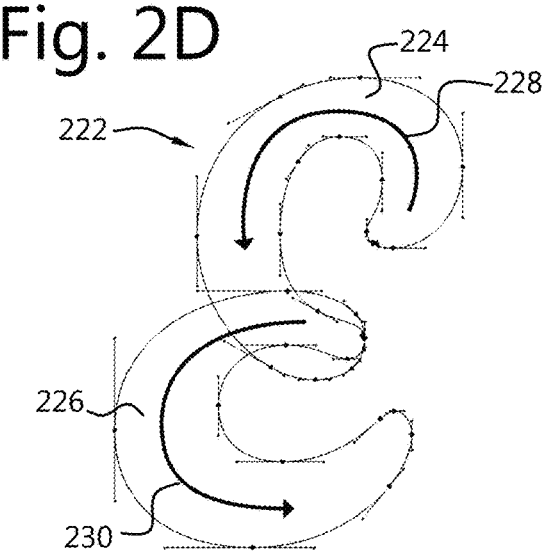

FIGS. 2B and 2D illustrate an example of an "E" glyph 222. The "E" glyph 222 shown in FIG. 2D comprises a first stroke 224 and a second stroke 226 wherein the first stroke 224 comprises a first direction 228 and the second stroke 226 comprises a second direction 230. Similar to FIG. 2B, the first and second strokes 224 and 226 and the first and second directions 228 and 230 may represent the order and direction on which a person would usually handwrite the letter "E" on a paper, for instance.

FIGS. 3A-3D illustrate glyph data comprising frames. The amount of frames are different for each glyph or graphical object or even for several instances of the same glyph or graphical object. By dividing a glyph or a graphical object in different numbers of frames, different animation times for each glyph or graphical object are provided. Dividing the glyph or graphical object in frames allows that only the required points in each frame (those which are moving) are interpolated in order to animate the glyph or graphical object.

Figure 3A:
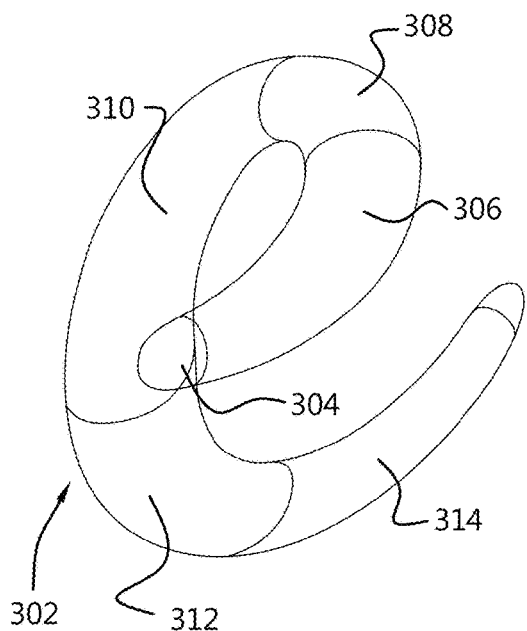
FIGS. 3A-3D illustrate an example of glyph data comprising frames according to an implementation of the present disclosure.
Figure 3B:
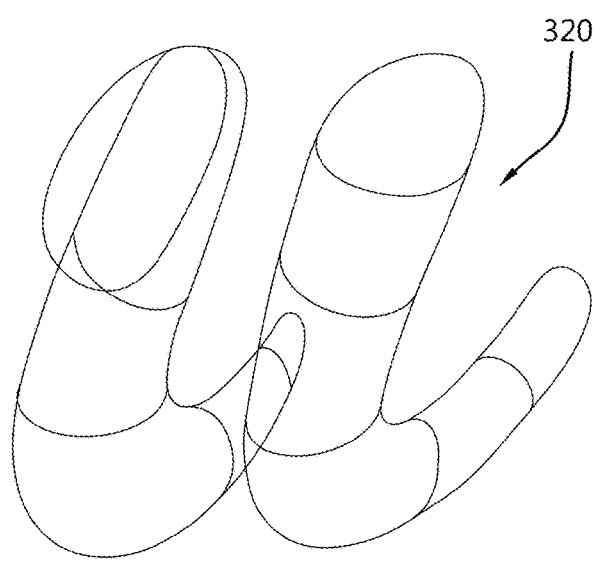

FIG. 3A shows an example of an "e" glyph 302 divided in seven frames, namely in a first frame 304, a second frame 306, a third frame 308, a fourth frame 310, a fifth frame 312, a sixth frame 314 and a seventh frame 317. A glyph may be divided in any suitable number of frames. FIG. 3B shows another example of a "u" glyph 320 divided in twelve frames. The interpolation of the glyphs is based on the frames. The frames can be stored in memory in two different ways: sequential or telescopic. The two different ways of storing the glyphs in memory will be explained later on.

Figure 3C:
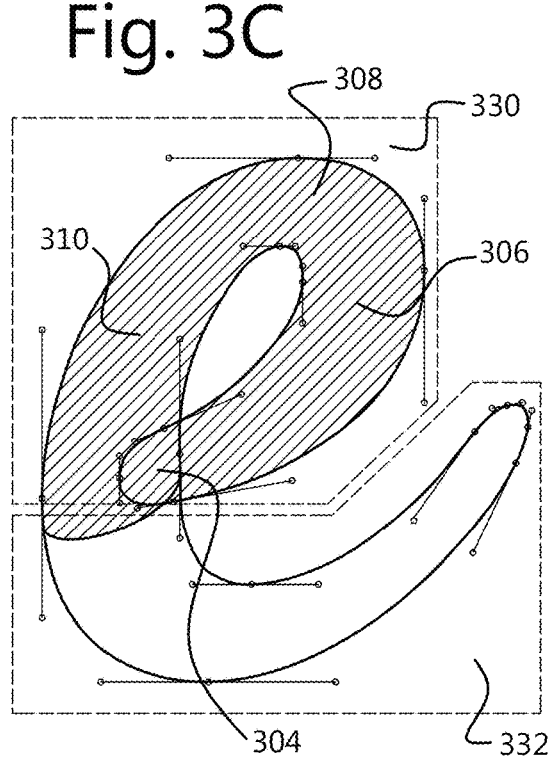
Figure 3D:
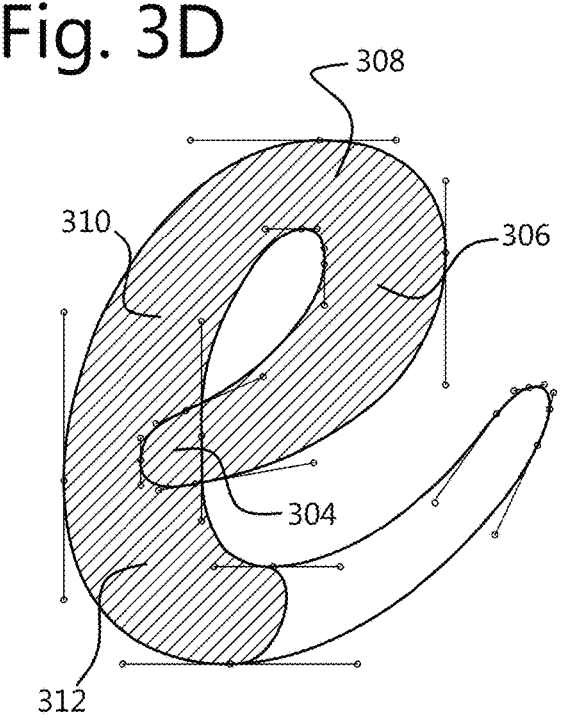

FIGS. 3C and 3D show how the fifth frame 312 of the "e" glyph 302 is interpolated. FIG. 3C shows the beginning of the interpolation of the fifth frame 312 wherein the glyph "e" is shown comprising frames 304, 306, 308 and 310. The points comprised in the area 320 will be interpolated. But the points comprised in the area 330 will not be interpolated, that is, said points remain static. FIG. 3D shows the end of the interpolation of the fifth frame 312 wherein the glyph "e" is shown comprising frames 304, 306, 308, 310 and 312.

Figure 4A:
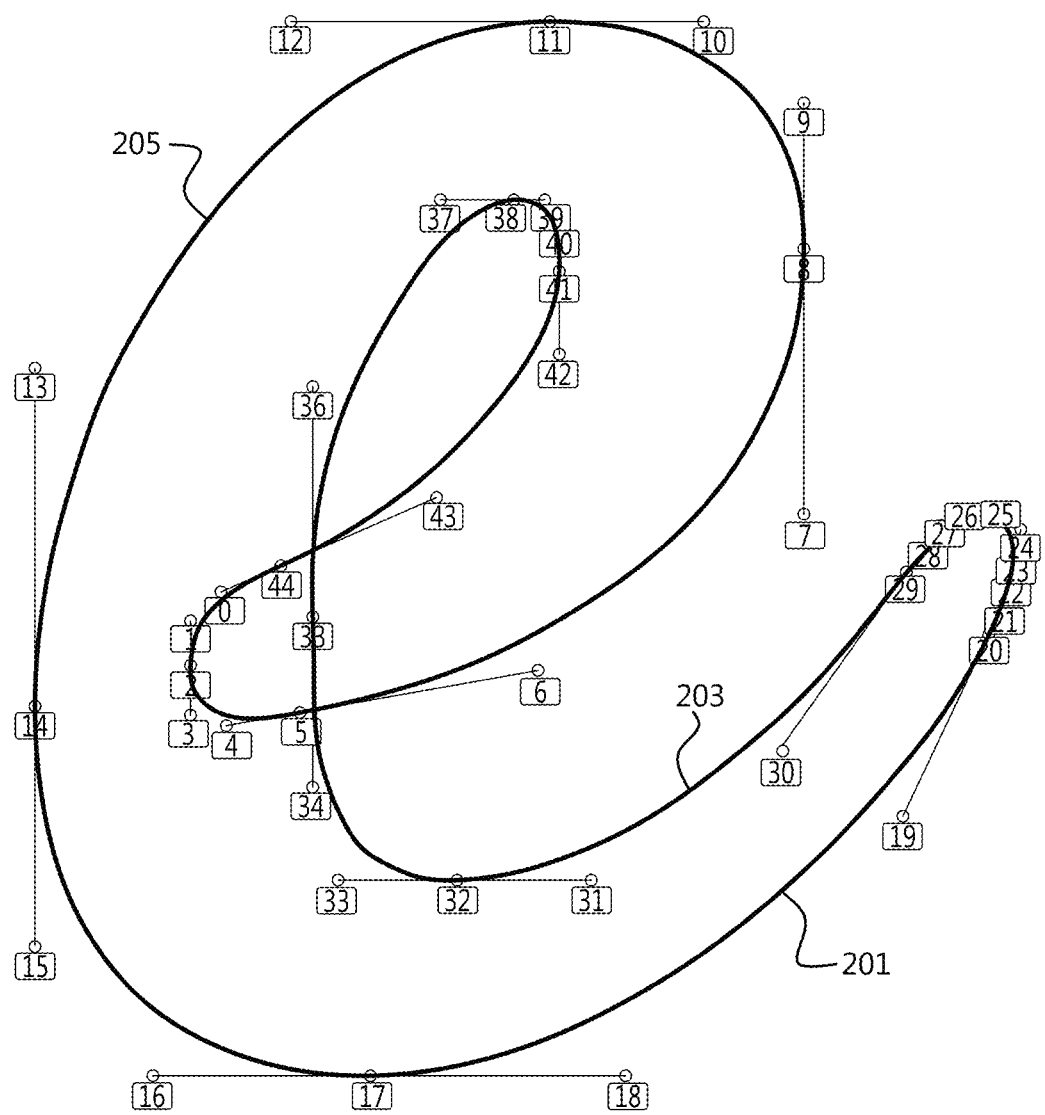
FIGS. 4A-4E illustrates an example of glyph data for an "e" glyph according to an implementation of the present disclosure.

FIGS. 4A-4E illustrate an example of glyph data for an "e" glyph according to an implementation of the present disclosure. FIG. 4A shows an example of an "e" glyph data comprising 45 points 0, 1, . . . , 44. The different points may be coupled in pairs wherein each pair of points comprises a first point located on a first side 201 of a trajectory 205 defining the shape of the graphical object and a second point located on a second side 203 of the trajectory. For instance, in FIG. 4A a pair of points is defined by a first point 7 on the first side 201 and a second point 42 on the second side 203. The off points (control points) of the curve points (points located on the contour) may be also coupled in pairs with the corresponding off points. For instance, in FIG. 4A, point 44 and point 5 are the first and second points of a pair of points wherein point comprises the control points 0 and 43 while point 5 comprises the control points 4 and 6. Then also points 0 and 4 may be the first and the second points of another pair of points and, in the same way, points 43 and 6 may be the first and second points of a further pair of points, The pairs of points in FIG. 4A are defined as (4+n*3, 45−n*3), (5+n*3, 44−n*3),(6+n*3, 43−n*3) for n>0 and n<=7. Points 1, 2 and 3 in FIG. 4A have not coupled points because they are starting points. The initial shape of the glyph is based on the three starting points 1, 2 and 3 and the first pairs of points, which are [(4,0), (5,44), (6, 43)].

Figure 4B:
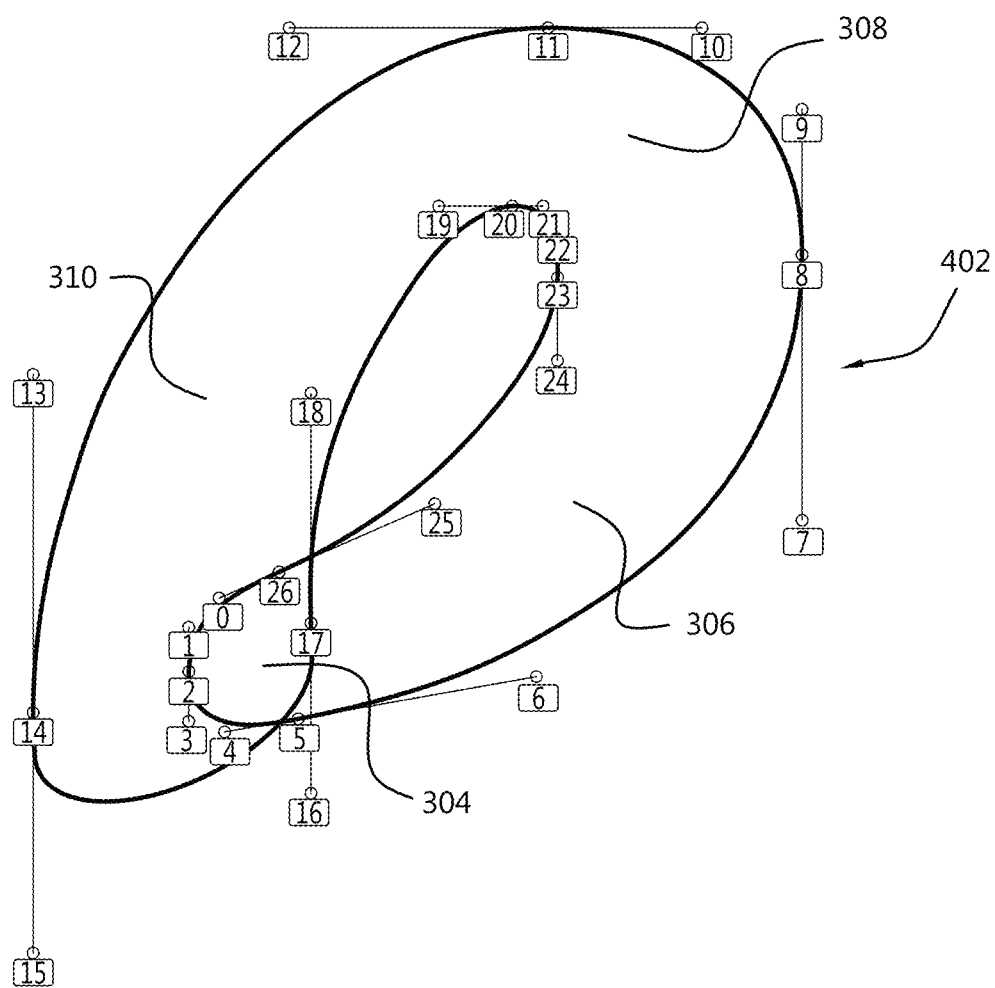
Figure 4C:
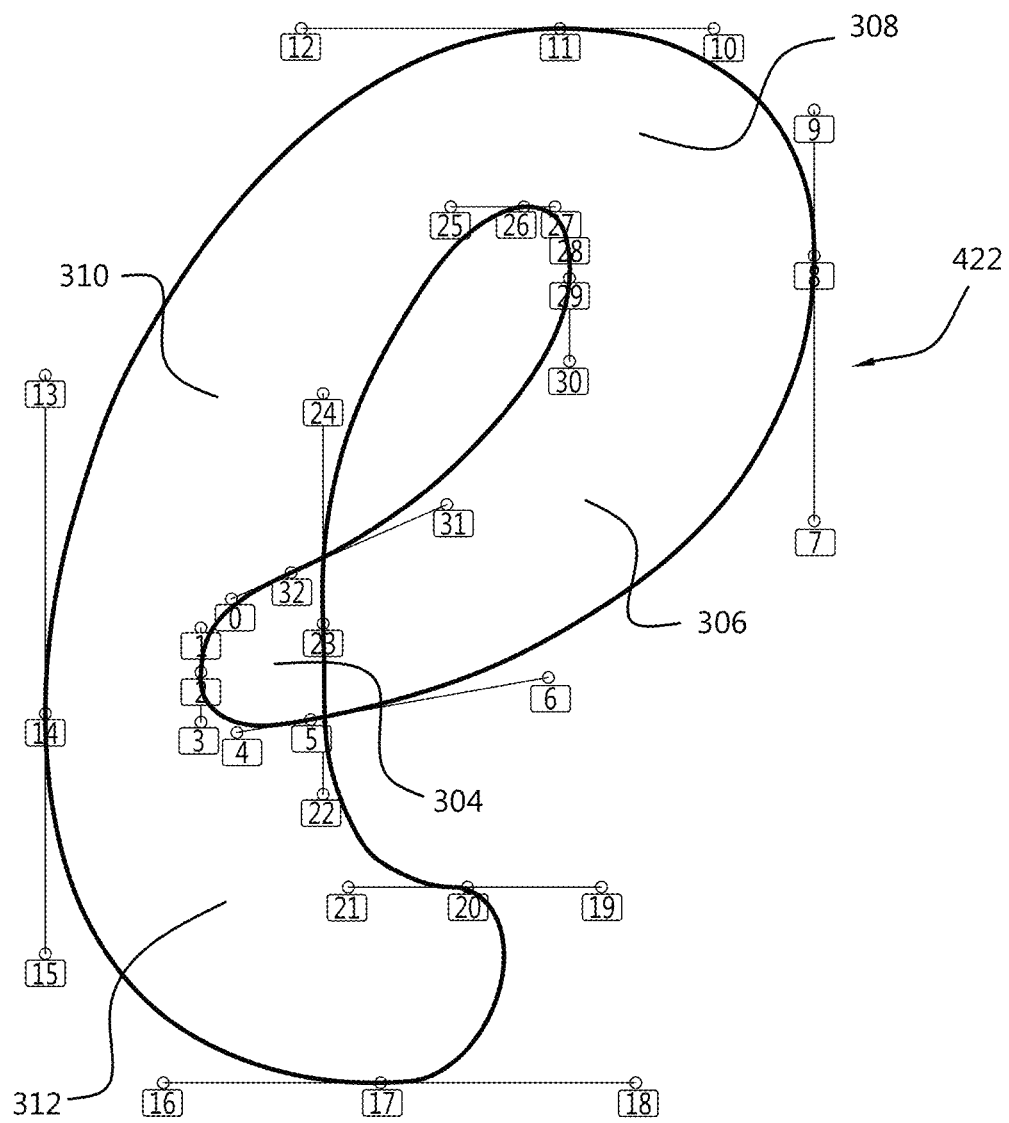

FIGS. 4B and 4C illustrate an example of interpolation using sequential storing wherein data related to each frame is stored separately in memory (for instance, stored in the font-file for being activated by the OpenType rvrn GSUB feature). When storing a graphical object or a glyph comprising frames in memory 104 in a sequential way, intermediate data of the graphical object or glyph is stored wherein the intermediate data related to a determined frame comprises the data related to previous frames and data related to the determined frame. Also the different intermediate data stored in the memory may comprise different numbers of points.

FIGS. 4B and 4C show an example of how the fifth frame 312 of the "e" glyph 302 is interpolated when the "e" glyph 302 is stored in memory 104 in a sequential way. FIG. 4B shows the intermediate data 402 comprising twenty seven points 0, 1, . . . 26 related to frame 310. FIG. 4C shows the intermediate data 422 comprising thirty three points 0, 1, . . . 32 related to frame 312.

Figure 4D:
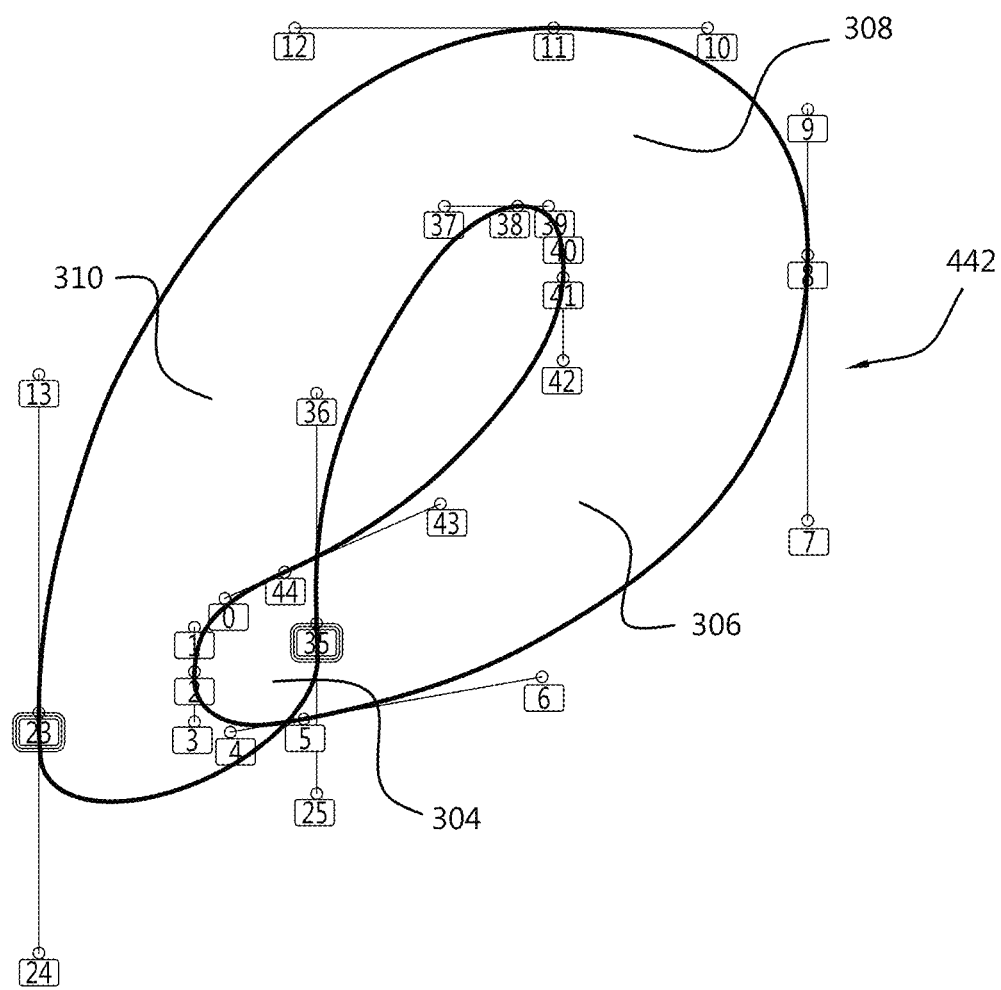
Figure 4E:
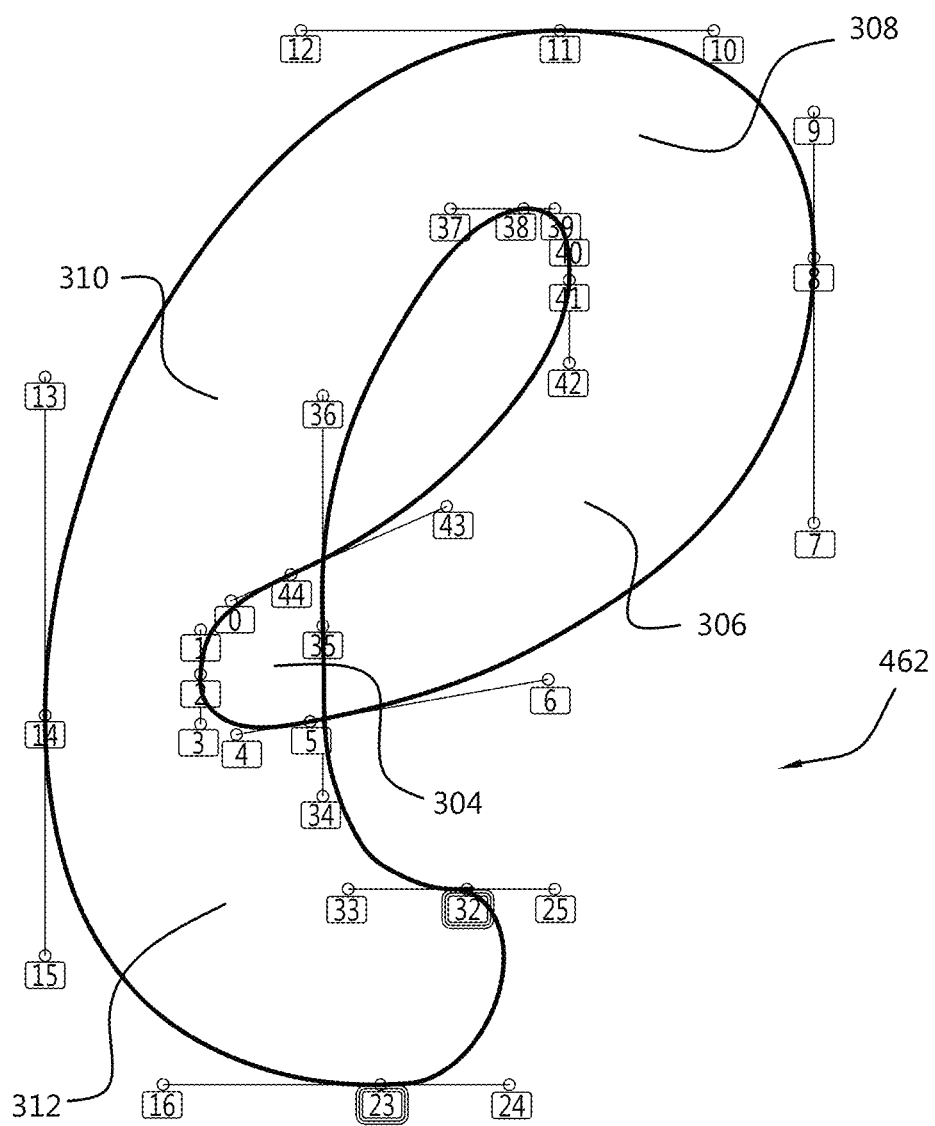

FIGS. 4D and 4E illustrate an example of interpolation using telescopic storing wherein only one glyph is stored (for instance, stored in the font file). When storing a graphical object or a glyph comprising frames in memory 104 in a telescopic way, no intermediate data of the graphical object or glyph is stored. Instead the final version of the glyph is stored in memory.

FIG. 4D shows the glyph 442 comprising frames 304, 306, 308 and 310 and comprising 45 points 0, 1, . . . 44. FIG. 4E shows the glyph 462 comprising frames 304, 306, 308, 310 and 312 and comprising also 45 points 0, 1, . . . 44. Both glyphs in FIGS. 4D and 4E comprise the same number of points because in a telescopic way, only the data corresponding to one glyph is stored in memory. In the example shown in FIGS. 4E and 4D, said glyph stored in memory comprises 45 points, and therefore every time a frame is interpolated, the starting glyph for that interpolation comprises as well 45 points. Also the ending glyph of said interpolation will comprise the same number of points, which in this example is 45 points.

Figure 5A:
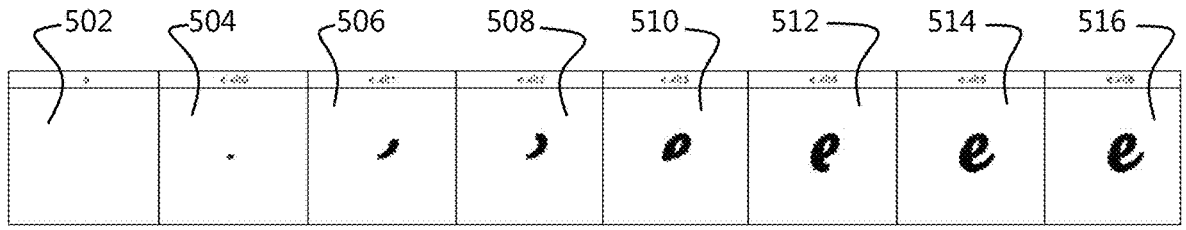
FIG. 5A-5B show an example of how to sequentially store in a font file the frames of the "e" glyph data shown in FIG. 4 according to an implementation of the present disclosure.
Figure 5B:
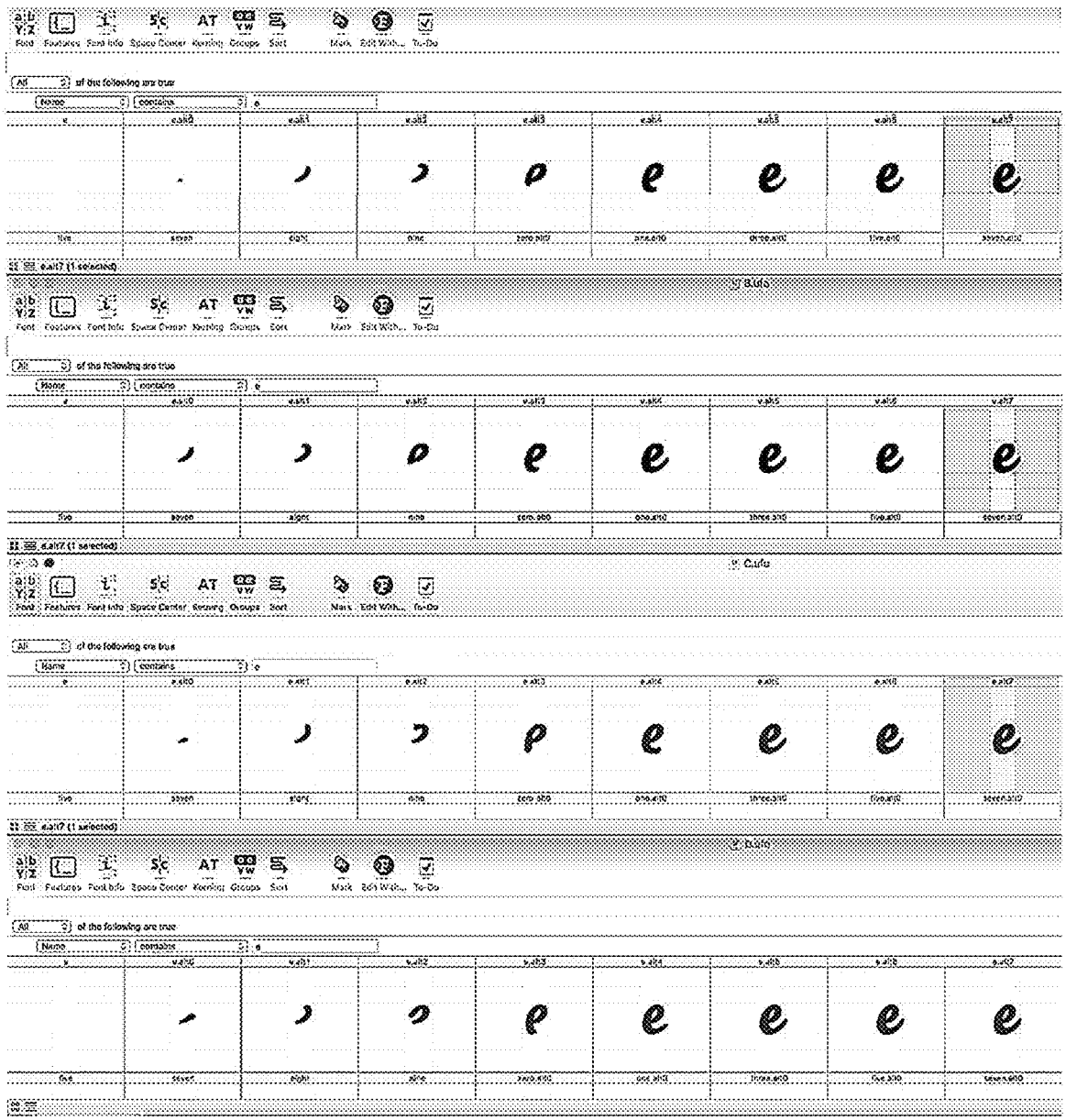

FIGS. 5A-5B show an example of how to sequentially store in memory, for instance as a font file or any other suitable kind of file, the frames of the "e" glyph data shown in FIG. 4A-4E. As it has been explained in relation to FIGS. 4B and 4C, in a sequential way the data of several intermediate glyphs is stored in memory. For instance, the intermediate glyphs can be stored in a font file or in any other suitable kind of file. For instance, when using OpenType Layout Common Table Formats, the intermediate glyphs may be used by the Glyph Substitution table ("GSUB"), which is part of the OpenType Layout tables providing typographic information for properly positioning and substituting glyphs. However, other standards or layouts may be used. Furthermore, a graphical object may be stored and animated in the same way as described in FIGS. 5A and 5B with regard to a glyph. In this example, as the glyph "e" comprises seven frames, then the data of eight intermediate glyphs 502-518 is stored in memory, each one comprising a different number of points.

Figure 6:
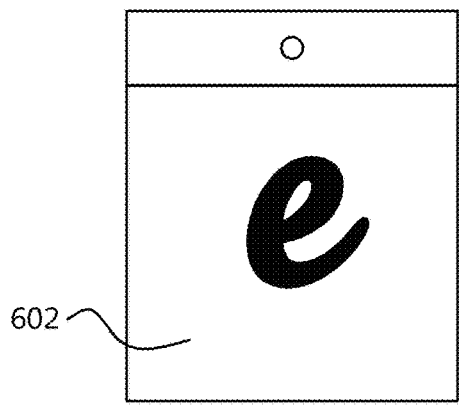
FIG. 6 shows an example of how to telescopically store in a font file the frames of the "e" glyph data shown in FIG. 4 according to an implementation of the present disclosure.

FIG. 6 shows an example of how to telescopically store in memory, for instance as a font file or any other suitable kind of file, the frames of the "e" glyph data shown in FIGS. 4A-4E. In this case, the frames are stored as a unique glyph data 602. In this case, all transformations are performed by applying deltas to a single outline.

Figure 7A:
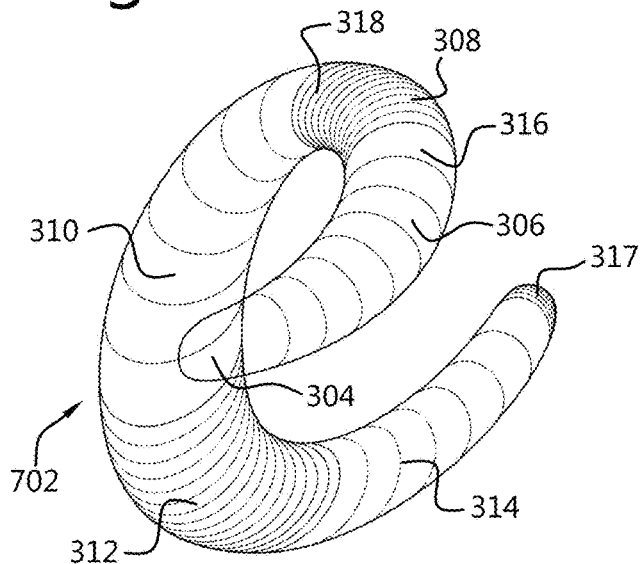
FIGS. 7A-7C show an example of a method to balance the frames of the "e" glyph data shown in FIG. 4.
Figure 7B:
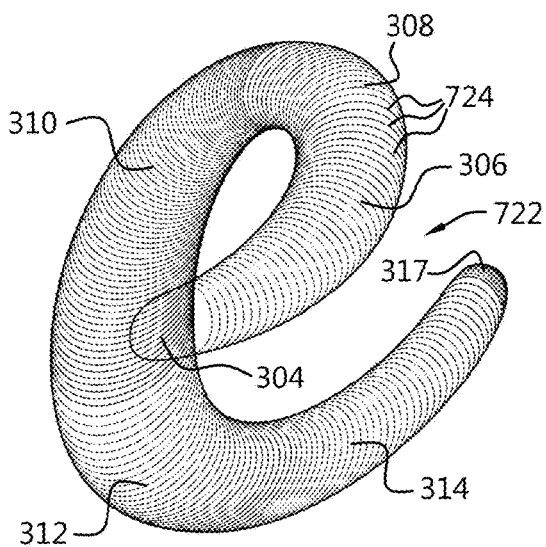
Figure 7C:
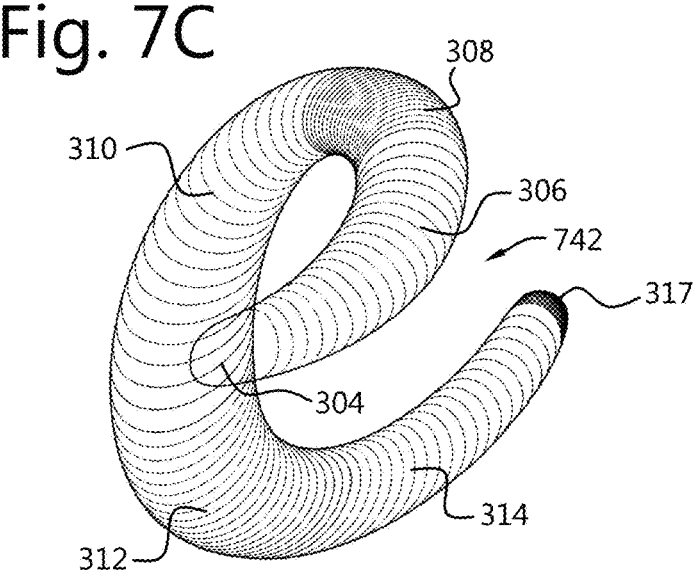

FIGS. 7A-7C show an example of a method to balance the frames of the "e" glyph data shown in FIGS. 4A-4E.

FIG. 7A shows the glyph "e" 702 of FIG. 4A divided in seven frames wherein no balance operation has been applied to the glyph 702. The different frames are divided in parts wherein each part represents an animation time unit meaning that in said part will be animated in a time unit. As it can be seen in FIG. 7A, the different parts have different sizes and this will have an effect on the animation speed of the different parts. For instance, part 316 of frame 306 is much wider than part 318 of frame 308. In this way, the speed animation of part 318 will be greater than the speed animation of part 316.

FIG. 7B shows the same glyph "e" as in FIG. 7A after a balance operation has been applied to the glyph. The different frames of glyph 722 are now divided in parts 724 having the same size such that the animation speed of the different parts is also the same.

FIG. 7C shows the same glyph "e" as in FIG. 7A after a balance operation has been applied to the glyph. In this case, the size of the different parts is not the same but represents an animation speed that imitates the speed at which a person would handwrite said part of the glyph.

FIGS. 8A-8H show examples of different points used to interpolate the frames of the "e" glyph shown in FIGS. 4A-4E.

Figure 8A:
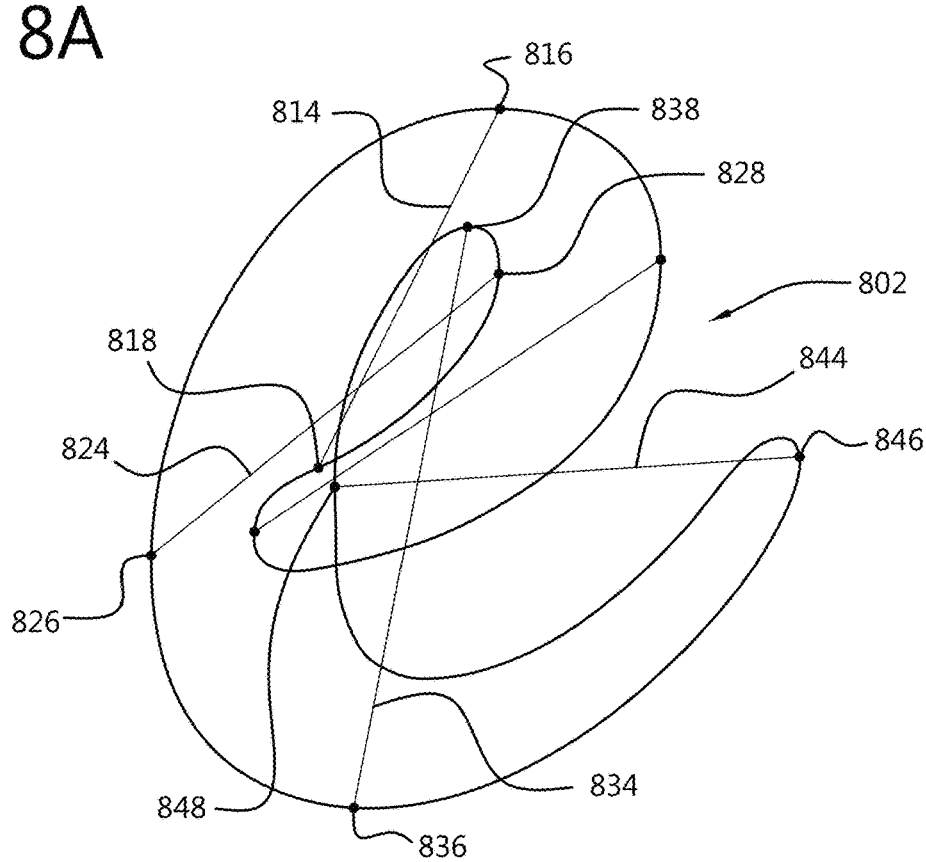
FIGS. 8A-8H show examples of different points used to interpolate the frames of the "e" glyph shown in FIG. 4.

FIG. 8A shows the "e" glyph 802 comprising pairs of interpolation points. The glyph 802 of FIG. 8A comprises a first pair 804 of points comprising a first point 806 and a second point 808, a second pair 814 of points comprising a first point 816 and a second point 818, a third pair 824 of points comprising a first point 826 and a second point 828, a fourth pair 834 of points comprising a first point 836 and a second point 838 and a fifth pair 844 of points comprising a first point 846 and a second point 848. As it is indicated in FIG. 8A, a first interpolation step will interpolate the first and second points of the first pair 804 respectively to the first and second points of the second pair 814, a second interpolation step will interpolate the first and second points of the second pair 814 respectively to the first and second points of the third pair 824, a third interpolation step will interpolate the first and second points of the third pair 824 respectively to the first and second points of the fourth pair 834, and a fourth interpolation step will interpolate the first and second points of the fourth pair 834 respectively to the first and second points of the fifth pair 844.

Figure 8B:
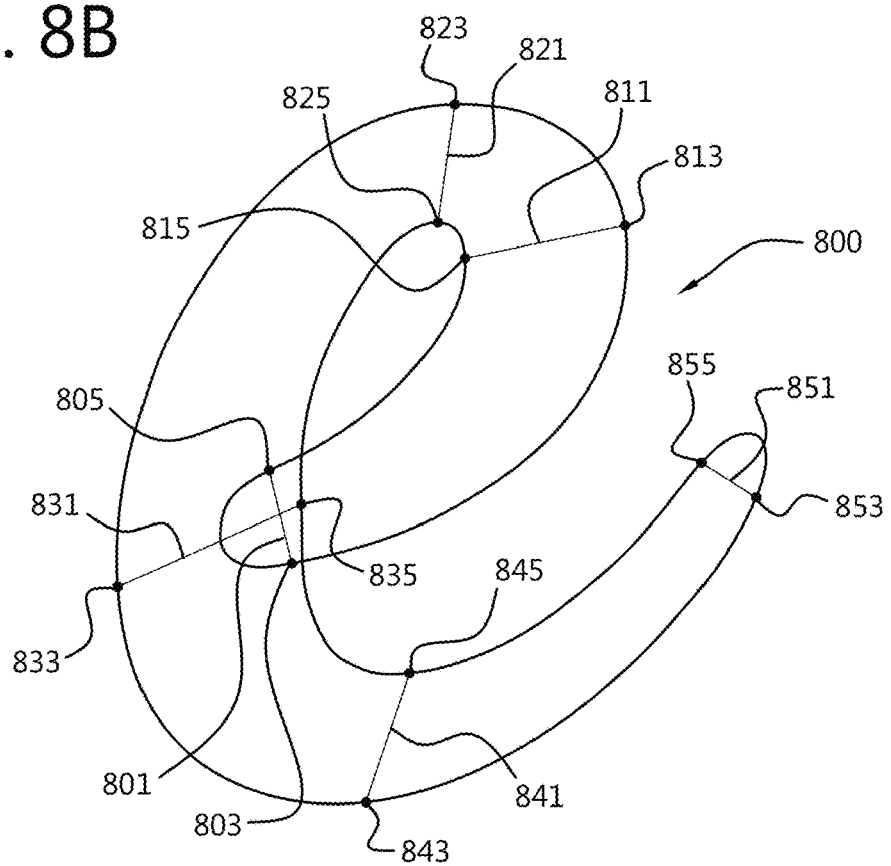

FIG. 8B shows the "e" glyph 800 comprising pairs of interpolation points. The glyph 800 of FIG. 8B comprises a first pair 801 of points comprising a first point 803 and a second point 805, a second pair 811 of points comprising a first point 813 and a second point 815, a third pair 821 of points comprising a first point 823 and a second point 825, a fourth pair 831 of points comprising a first point 833 and a second point 835 and a fifth pair 841 of points comprising a first point 843 and a second point 845. As it has been explained in relation to FIG. 8A, a first interpolation step will interpolate the first and second points of the first pair 801 respectively to the first and second points of the second pair 811, a second interpolation step will interpolate the first and second points of the second pair 811 respectively to the first and second points of the third pair 821, a third interpolation step will interpolate the first and second points of the third pair 821 respectively to the first and second points of the fourth pair 831, and a fourth interpolation step will interpolate the first and second points of the fourth pair 831 respectively to the first and second points of the fifth pair 841. The pairs of points in FIG. 8B are defined such that the line connecting the first point and the second point of each pair is perpendicular to a line tangent to the contour of the glyph at that first point. In this way, the animation is always synchronized between both sides of the contour.

Figure 8C:
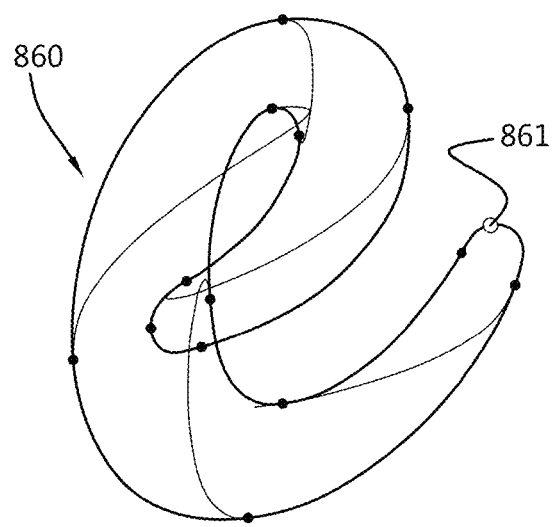
Figure 8D:
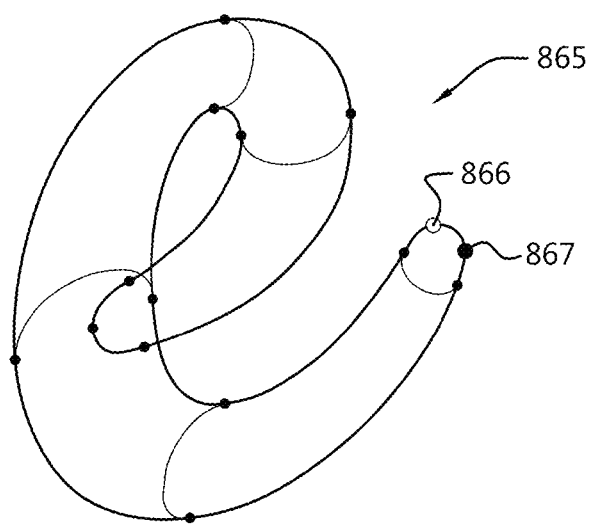

FIG. 8C shows the "e" glyph 860 comprising a wrongly positioned ending point 861. The starting point 861 causes the coupled points to be un-balanced. FIG. 8D shows the "e" glyph 865 comprising a first ending point 866 and a second ending point 867. In that way we ensure that the other points are correctly coupled. The two ending points 866 and 867 synchronize both sides of the contour when animating the glyph.

Figure 8E:
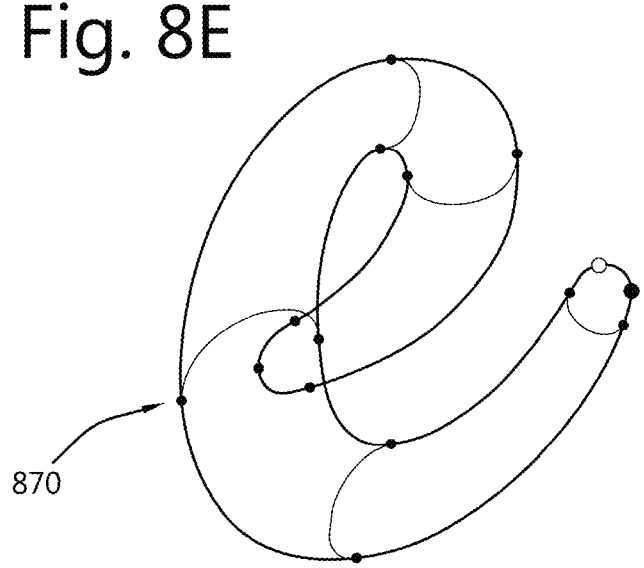
Figure 8F:
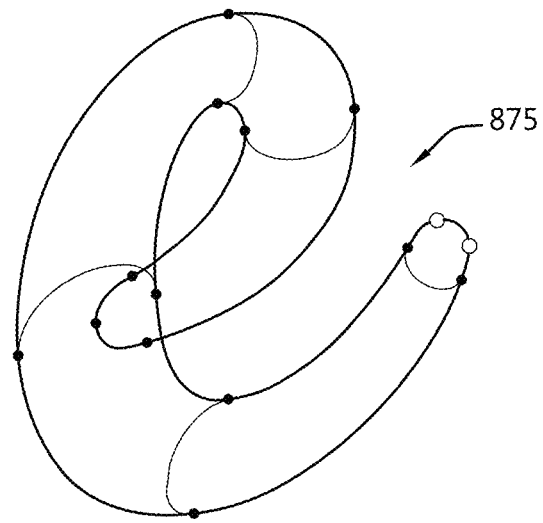

FIGS. 8E and 8D show that the same approach can be applied to modify the animation and the way the frames are structures. FIG. 8F shows four points used as a ending point. In that way, two 'frames' are merged.

Figure 8G:
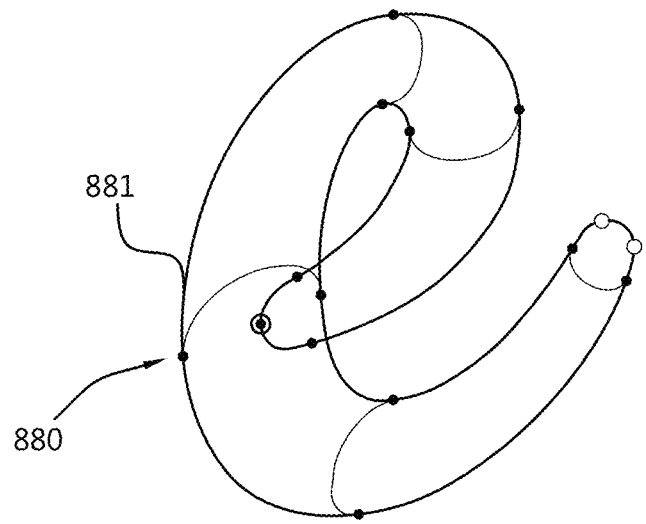
Figure 8H:
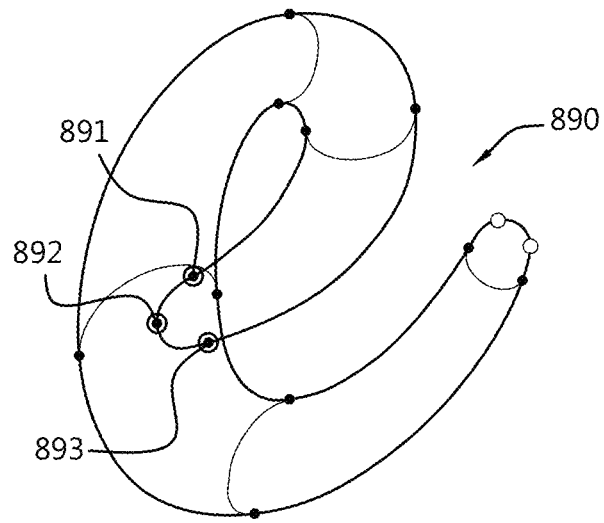

FIG. 8G shows the "e" glyph 880 comprising an starting point 881. The starting point 881 is where the animation starts and represents the starting point of the next interpolation step. FIG. 8H shows the "e" glyph 890 comprising a first starting point 891, a second starting point 892 and a third starting point 893. In that way the initial shape is different and the animation is constructed in one 'frame' less, because two frames are merged. Having three starting points (instead of one) keeps the synchronization of both sides of the contour when animating the glyph.

Figure 9A:
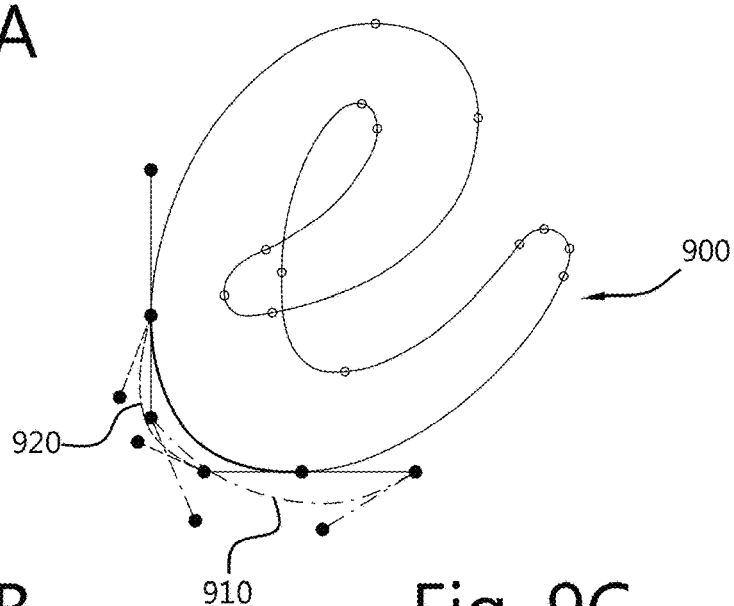
FIGS. 9A-9G show an example of a higher order interpolation for variable fonts.

FIG. 9A illustrates an example of the application of a method using a higher order interpolation for animating a glyph 900. Variable fonts are defined by the connections between the points of different outlines. TrueType and PostScript may be used to define the outlines. Digital curve techniques are based on quadratic curves wherein two outline points located on the outline and one control point located outside the outline are used. Cubic Bezier curves comprising two outline points located on the outline and two control points located outside the outline are also used (for instance in CFF OpenType). In this way, the trajectory from a point A on the outline to a point B on the outline is calculated. FIGS. 9B-9G illustrate how a point of the trajectory between point A and point B is calculated using higher order interpolation (HOI).

Figure 9B:
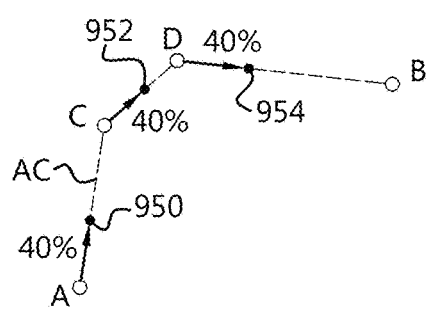

FIG. 9B shows the first steps to interpolate from a point A on the outline to a point B on the outline. First, in FIG. 9B, three lines are determined: a line AC connecting the outline point A to the control point C, a second line CD connecting the control point C to the control point D, and a third line DB connecting the control point D to the outline point B, and then three points 950, 952 and 954 are calculated wherein point 950 is located on the line AC at a distance from outline point A equal to 40% of the total length of line AC, point 952 is located on the line CD at a distance from control point C equal to 40% of the total length of line CD and point 954 is located on the line DB at a distance from control point D equal to 40% of the total length of the line DB.

Figure 9C:
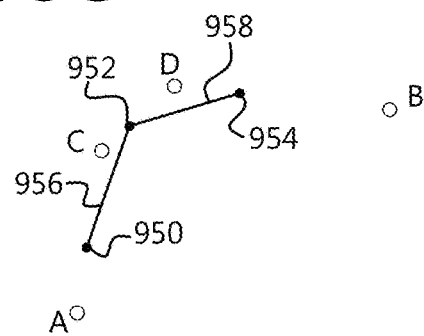

After performing the steps explained in relation to FIG. 9B, further steps for the calculation of the trajectory from a point A on the outline to a point B on the outline are shown in FIG. 9C. FIG. 9C shows how two further lines are determined: a line 956 connecting the point 950 to the point 952 and a line 958 connecting the point 952 to the point 954.

Figure 9D:
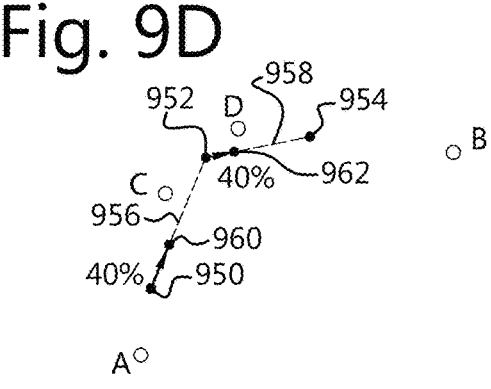

FIG. 9D shows how two further points 960 and 962 are determined wherein the point 960 is located on the line 956 at a distance from point 950 equal to 40% of the total length of line 956, and the point 962 is located on the line 958 at a distance from point 952 equal to 40% of the total length of line 958.

Figure 9E:
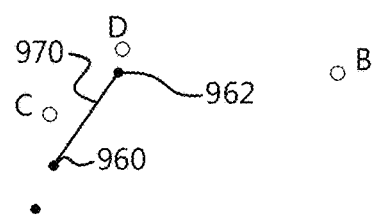
Figure 9F:
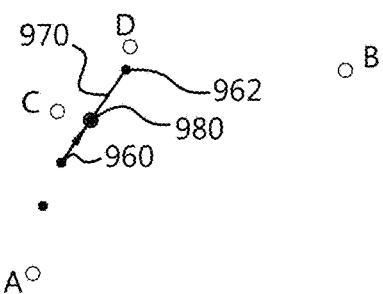

In FIG. 9E, line 970 is determined by connecting the point 960 and the point 962 which were determined in the step explained in relation to FIG. 9D. In FIG. 9F the point 980 is determined wherein the point 980 is located on the line 970 at a distance from point 960 equal to 40% of the total length of the line 970. As it can be seen in FIG. 9G, the point 980 is the interpolated point.

Figure 9G:
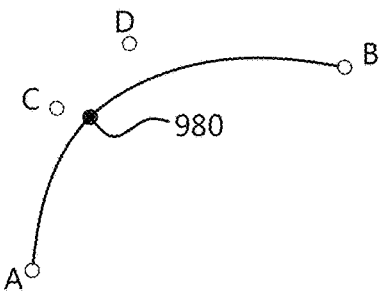
Figure 10A:
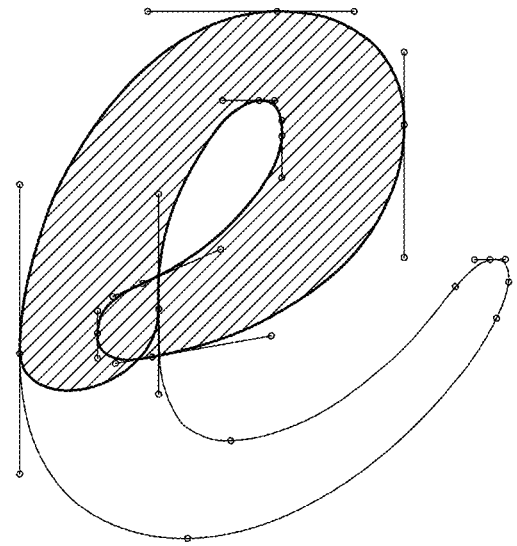
Figure 10B:
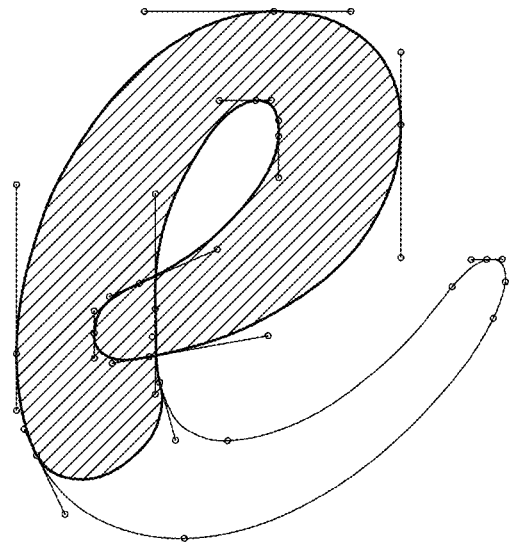
Figure 10C:
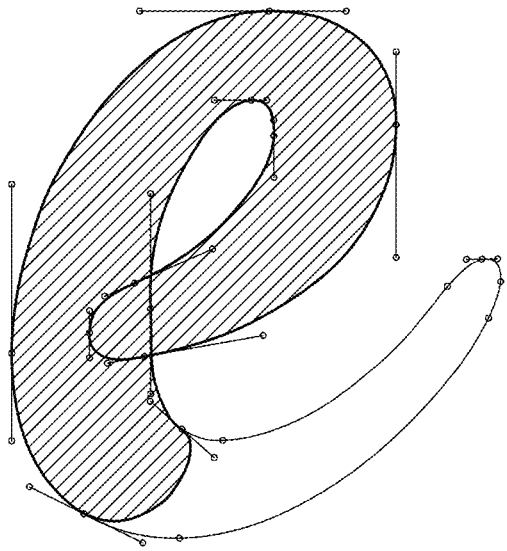
Figure 10D:
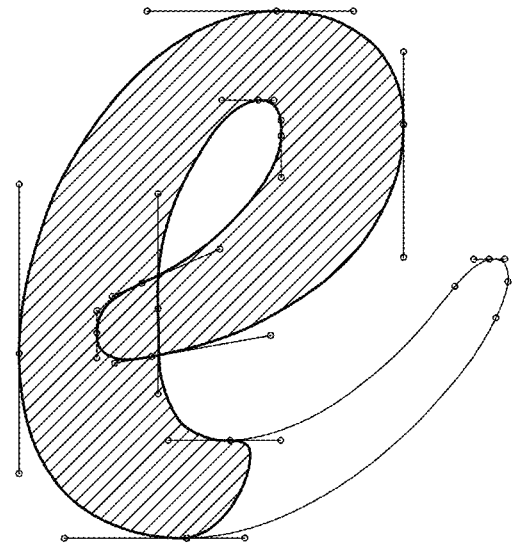

By iteratively applying the steps explained in relation to FIGS. 9B-9G using other distances on the different lines to calculate the different points instead the 40% of the length of the line as it was used in said figures, further points can be interpolated giving as a result the interpolation of the curve 990 that connects points A and B in FIG. 9G. For instance, another iteration to interpolate another point of the curve 990 may comprise repeating all the steps explained in FIGS. 9B-9G but using 20%, for instance, as a value wherein it has been used 40%. Other iterations would use other suitable values.

The interpolation method explained in relation to FIGS. 9B-9G can be applied to interpolate points connecting the outline points A and B. This method can be applied as well to the control points C and D used in the interpolation. This is shown in FIG. 9A, wherein the method explained in relation to FIGS. 9B-9G has been applied three times to each of the control points C and D such that for the control point C the interpolated points C1, C2 and C3 have been calculated and for control point D the interpolated points D1, D2 and D3 have been calculated. This provides for a smooth animation which matches more closely the real way on which the glyph "e" would be handwritten. As explained, in order to make the animation fluently and sharp, not only the points located on the outline, such points A and B, but also the control points, such C and D, need to move on predefined bezier curves. The outline point A has to move to the outline point B on a 'curved' trajectory defined by the two control points C and D. But the two control points C and D may also move on similar curves, defined by the two control points D2 and D3 (for moving D1 to D) and the control points C3 and C2 (for moving C to C1). This is further shown in FIGS. 10A-10D, which illustrate an example of an artificial higher order interpolation (AHOI) applied to points C and D which travel following AHOI paths defined by C1, C2, C3, C4 and D1, D2, D3, D4 respectively.

The four points D2, D3, C3 and C2 may be calculated by an Artificial Higher Order Interpolation "AHOI" algorithm. By applying the AHOI algorithm, the AHOI trajectories such as the AHOI trajectory 910 and the AHOI trajectory 920 can be determined and, from the AHOI trajectories, the AHOI glyphs that will be used for the final animation can be determined.

Figure 11A:
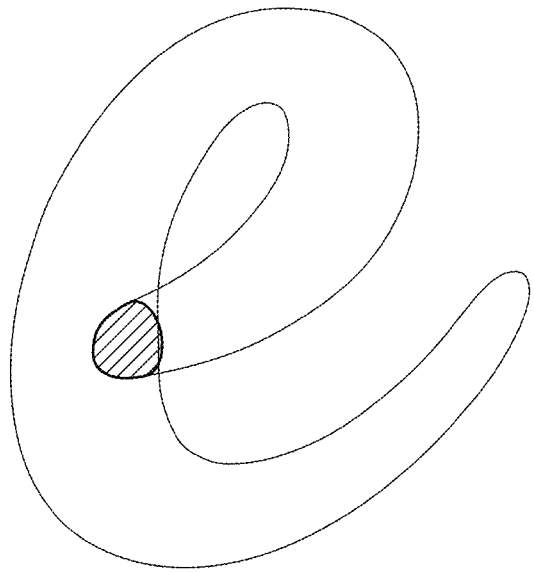
FIGS. 11A and 11B show an example of the two glyph frames that would be stored in memory to be used to animate a glyph "e" when the AHOI method is not used and FIGS. 12A and 12B show an example of the same glyph frames but generated using an AHOI method.
Figure 11B:
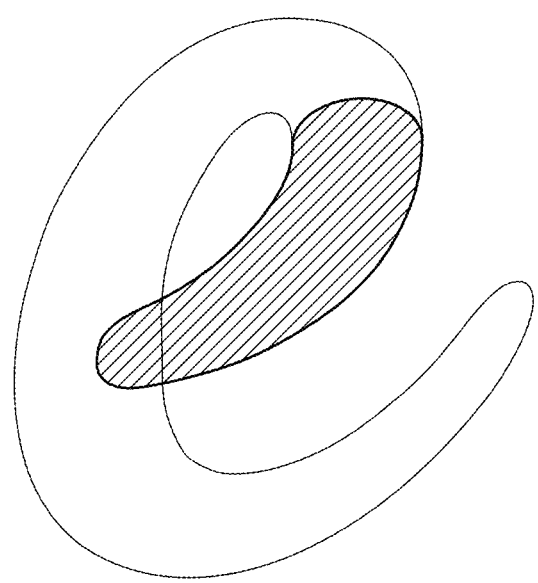
Figure 12A:
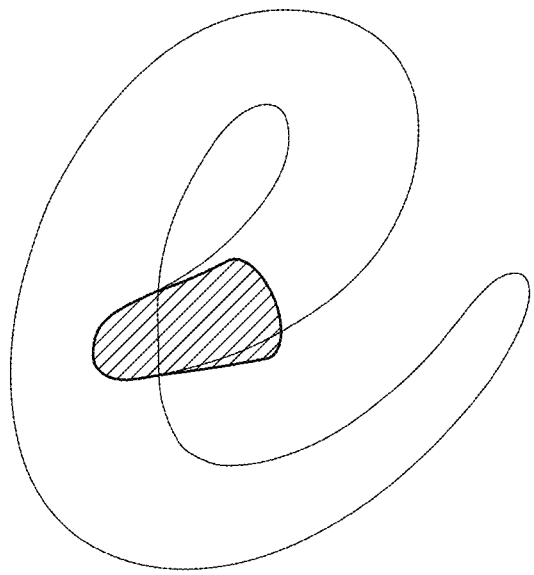
Figure 12B:
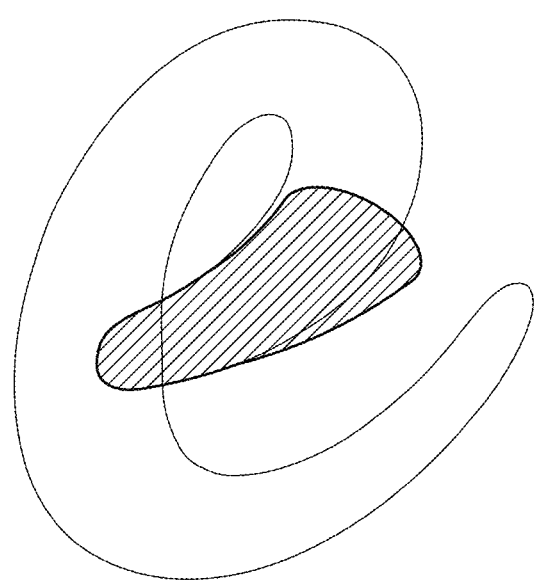

FIGS. 11A and 11B show an example of the two glyph frames that would be stored in memory to be used to animate a glyph "e" when the AHOI method is not used and FIGS. 12A and 12B show an example of generated AHOI glyphs in combination with beginning and ending frames, which enables the smooth transition (based on the contour of the outline) of FIG. 11A into FIG. 11B.

Figure 13A:
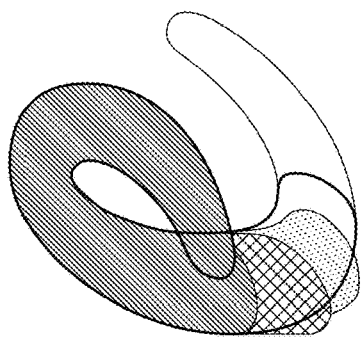
FIGS. 13A-13E shows the layers generated by the AHOI method.

FIG. 13A illustrates all layers A, C, D and B (A is black, C is orange, D is blue, and B is grey), whereby A is the beginning of the frame, and B is the ending of the frame. Layer C & D are the AHOI layers which are used to interpolate the frame A to B, using cubic interpolation. Cubic interpolation always consist of four points, whereby point 1 is the starting point, and point 4 in the ending point. Point 2 & 3 are the control points. Using the 4 contours within a parametric cubic function will make sure that the two frames are morphing fluently into each other (see illustration 20 or 29: ACDB are relating here to point 1, 2, 3 & 4).

Figure 13B:
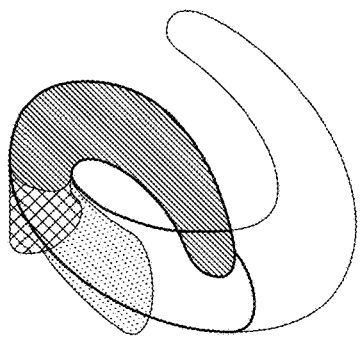
Figure 13C:
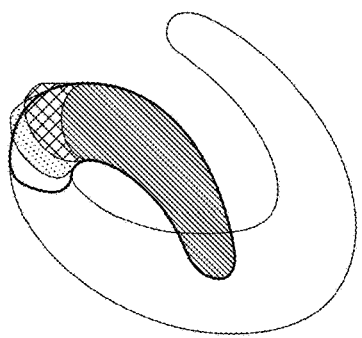
Figure 13D:
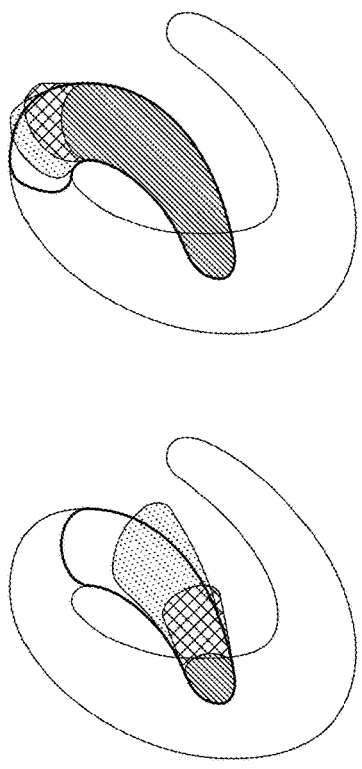
Figure 13E:
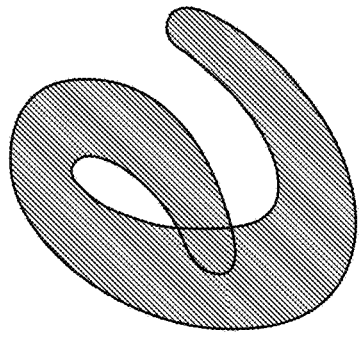
Figure 13F:
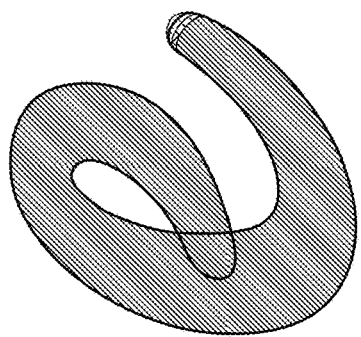
Figure 13G:
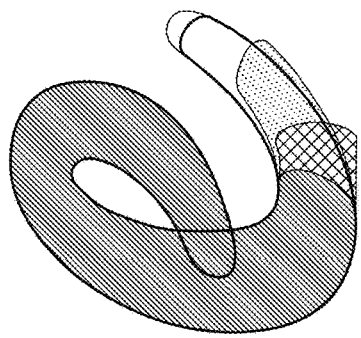

FIG. 13B illustrates the layers generated by the AHOI method for the second frame of the glyph "e", and FIGS. 13C, 13D, 13E and 13F illustrate respectively the layers for the third, fourth, fifth and sixth frames of said glyph "e". FIG. 13G illustrates the last frame (which is very short) of the glyph "e".

Figure 14A:
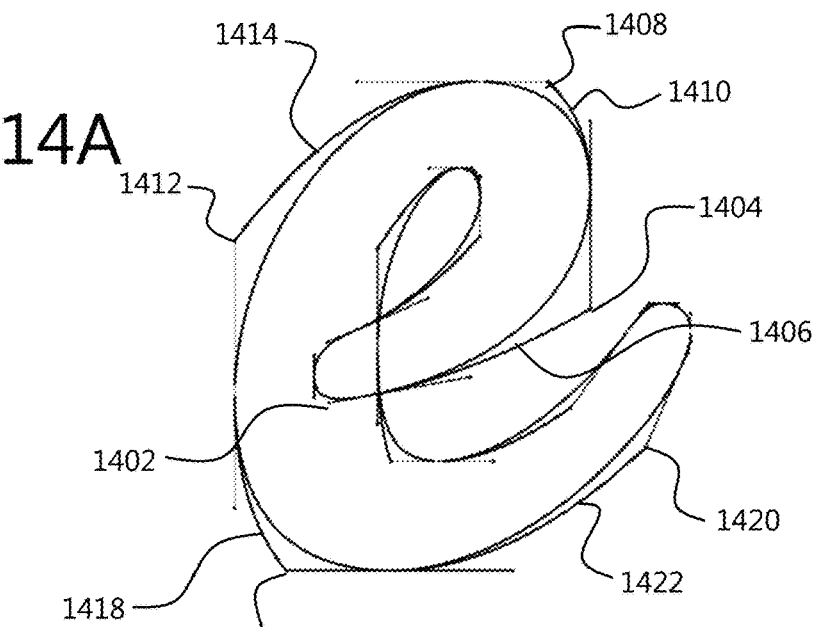
FIGS. 14A-14C show an example of the AHOI method.
Figure 14B:
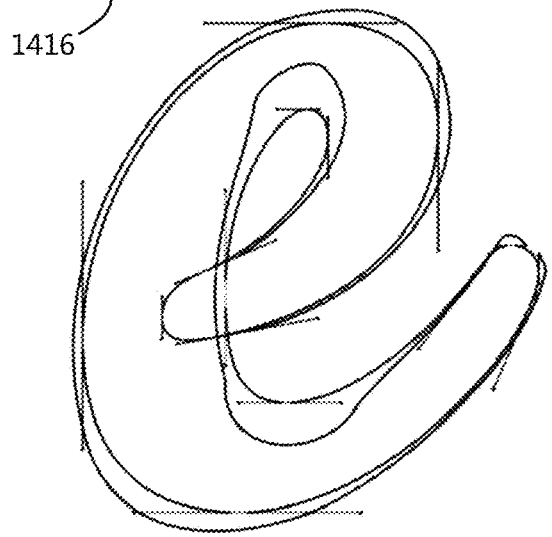
Figure 14C:
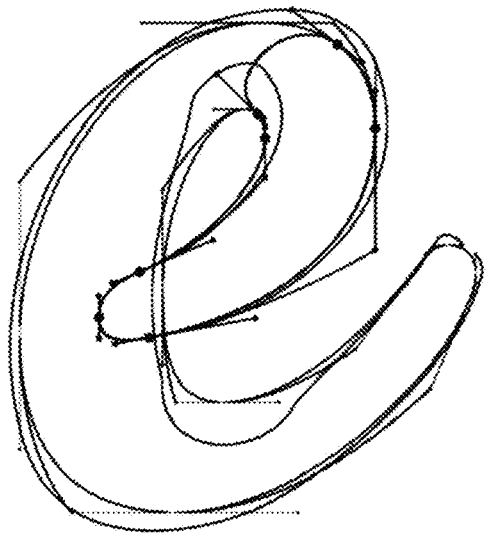

FIGS. 14A-14C show an example of how the control point 1402 is interpolated to the first interpolated control point 1404 using AHOI and following curve 1406, then the first interpolated control point 1404 is interpolated to the second interpolated control point 1408 using AHOI and following curve 1410. After that, the second interpolated control point 1408 is AHOI interpolated to the third interpolated control point 1412 following curve 1414, the third interpolated control point 1412 is AHOI interpolated to the fourth interpolated control point 1416 following curve 1418, and finally the fourth interpolated control point 1416 is AHOI interpolated to the fifth interpolated control point 1420 following curve 1422.

Figure 15A:
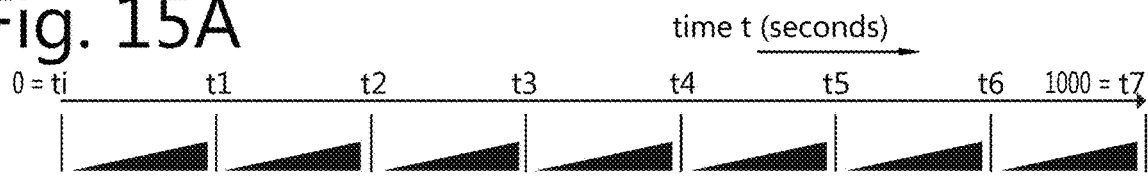
FIGS. 15A-15E illustrate interpolation examples.
Figure 15B:
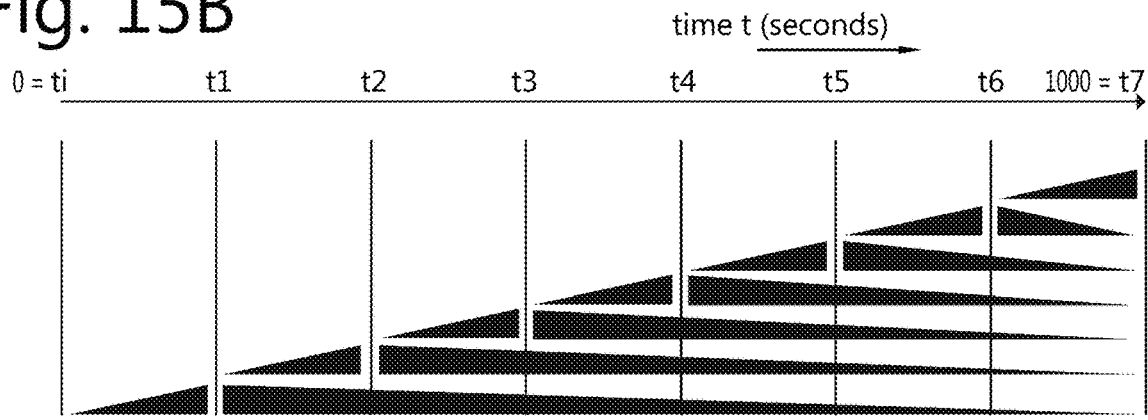
Figure 15C:
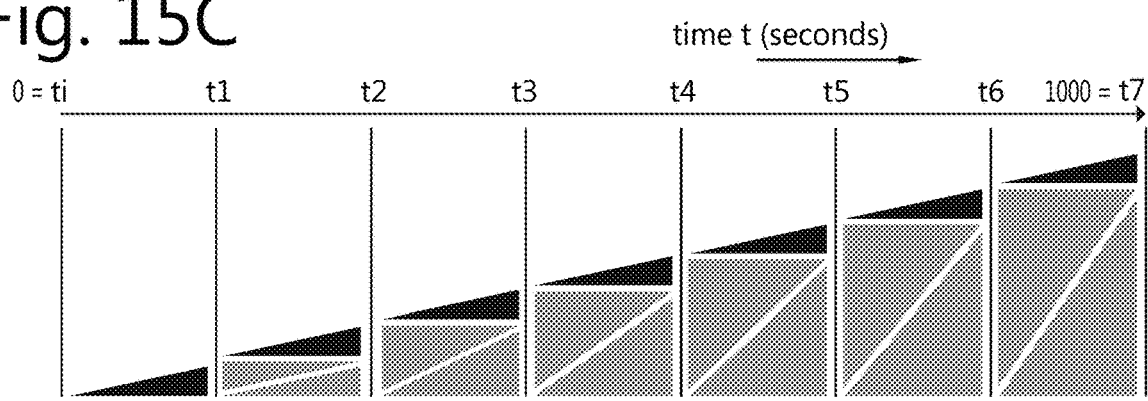

FIG. 15A shows the interpolations corresponding to each of the frames into which glyph "e" of FIG. 4 is divided when using the sequential method previously explained in relation to FIGS. 4B, 4C, 5A and 5B. FIGS. 15A-C show a vertical axis t indicating the animation time. The time is expressed as per cents wherein the animation starts at $t_1=0$ (0% of the animation) and ends at $t_f=1000$ (100% of the animation is completed). As it can be seen in FIG. 15A, when using the sequential method, there is only one interpolation applied at a certain time. In FIG. 15A, an example will be described for the case of sequentially stored intermediate glyphs 502-518. The first interpolation starts in $t=t_i$ with the intermediate glyph 502 and ends in $t=t_j$ with the intermediate glyph 504. In $t=t_j$, the second interpolation starts with the intermediate glyph 504 and ends in t=t$_2$ with the intermediate glyph 508. In the same way, the third interpolation interpolates from the intermediate glyph 508 starting at t=t$_2$ to the intermediate glyph 510 in t=t$_3$. The fourth interpolation starts in t=t$_3$ with the intermediate glyph 510 and ends in t=t$_4$ with the intermediate glyph 512. In t=t$_4$, the fifth interpolation starts with the intermediate glyph 512 and ends in t=t$_5$ with the intermediate glyph 514. In the same way, the sixth interpolation interpolates from the intermediate glyph 512 starting at t=t$_5$ to the intermediate glyph 514 in t=t$_6$. Finally, the seventh interpolation, going from t=t$_6$ to t=t$_f$, interpolates from the intermediate glyph 514 to intermediate glyph 516.

Figure 15D:
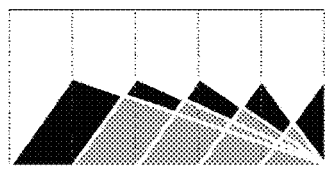
Figure 15E:
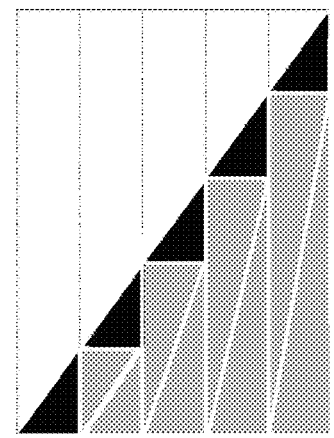

FIGS. 15B-15C show interpolations corresponding to each of the frames into which glyph "e" of FIG. 4 is divided when using the telescopic method previously explained in relation to FIGS. 4D, 4E and 6. In the telescopic method, no intermediate data of the graphical object or glyph is stored. Instead the final version of the glyph is stored in memory. Therefore, the same glyph is interpolated in each interpolation step. This means that multiple interpolations are applied at the same time, as shown in FIG. 15B. The general formula for n frames is: vector=p+d1*w1+d2*w2++dn*wn (p=point coordinate, d=deltas, w=weights). Whereby rounding errors can occur for every individual delta. So the rounding-error-margin becomes bigger, the more deltas are involved. The total error margin is: e1+e2+e3+en (where e1 is the error margin of d1*w1, e2 the error margin of d2*w2 . . . ). This can cause dramatic rounding problems and lead to no sharp wobbling animations wherein points which are supposed to be static are moving slightly. To improve this, the method that will be explained in relation to FIG. 15C can be applied. As it can be seen in FIG. 15B, when using the telescopic method, several interpolations are applied at certain time because each started interpolation will not finish until t$_f$. This has been solved in FIG. 15C wherein instead of overlapping interpolations that has started at different times, three interpolations will be applied in every interval wherein the interpolations in FIG. 15B overlap. For instance, between t1 and t2, in FIG. 15B the interpolation 1500 corresponding to the second frame of the glyph "e" starts while part of the interpolation 1502 of the first frame which has started in t=t$_i$ is still going. However, in FIG. 15C three interpolations 15008, 1506 and 1504 take placed wherein each of them starts in t=t1 and ends in t=t1. This is also illustrated in FIGS. 15D-15F wherein FIG. 15D shows the method according to FIG. 15B and FIG. 15E shows the method according to FIG. 15C, the two cross-regional interpolations are not cancelling each other, but complimenting each other.

Figure 16A:
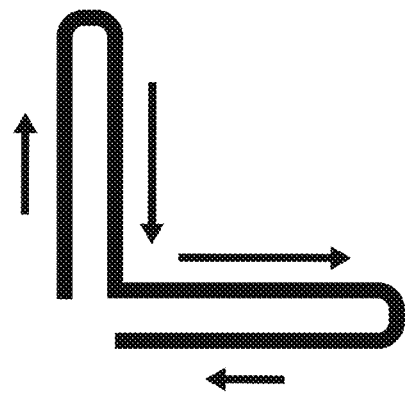
FIGS. 16A-16D illustrate how the speed of the animation can be modified based on different animation parameters.
Figure 16B:
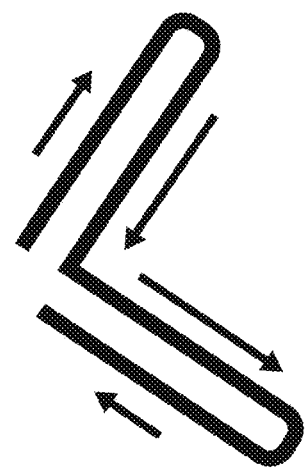
Figure 16C:
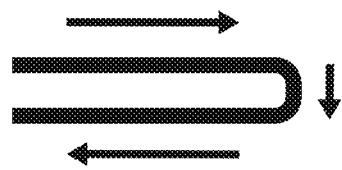
Figure 16D:
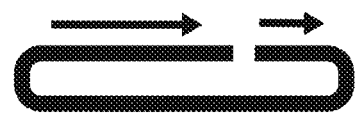
Figure 16E:
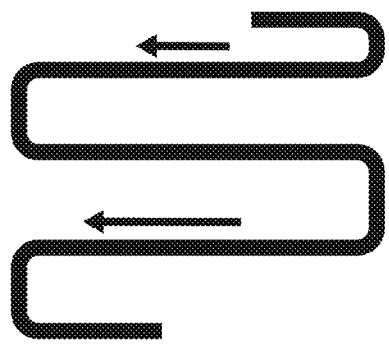

FIGS. 16A-16D illustrates how the speed of the animation can be modified based on different animation parameters. The direction on which the arrows point indicates the direction of the animation. The length of each arrow is proportional to the animation speed such that the longer the arrow, the higher the speed and vice versa. FIGS. 16A and 16B indicate how to change the speed of the animation based on direction of the animation of the graphical object. For instance, the animation speed may decrease when the animation direction is from down to up or from right to left. The animation speed may increase when the animation direction is from up to down or from right to left in the display. FIG. 16C indicates how to change the speed of the animation based on the curvature of the contour or outline of the graphical object. For instance, the animation speed may decrease when the curvature increases and the speed may increase when the curvature decreases. FIG. 16D indicates how the speed of the animation varies based on pattern repetition in the contour or outline of the graphical object. For instance, the animation speed may increase if the animation repeats a pattern such as in FIG. 16E. By using different 'time-spans' for t1, t2, t3, t$_4$ . . . in FIG. 15c, the individual animation speeds can be defined for each glyph and frame separately, so that the writing speed looks very natural (like for example faster in straight sections, and slower in tight curves).

Figure 17:
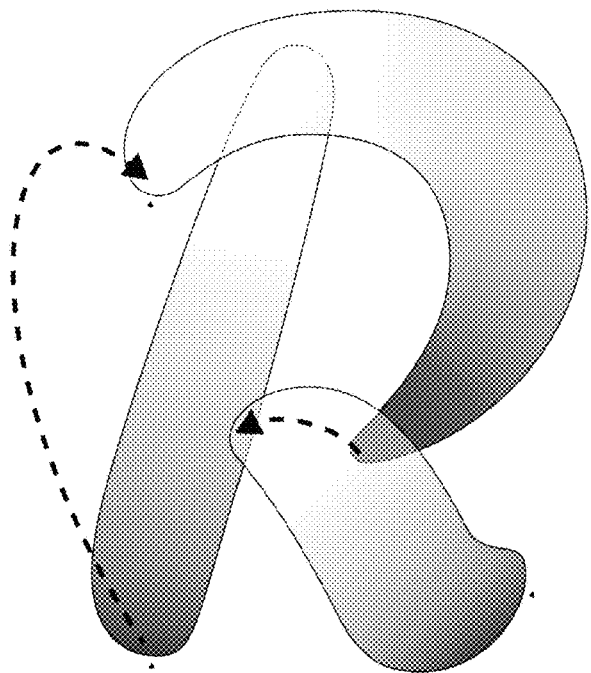
FIG. 17 shows an example of a method for animating a graphical object.

FIG. 17 shows an example of a method for animating a graphical object wherein the animated graphical object comprises a plurality of elements each one defining the shape of the graphical object and wherein generating the animated graphical object comprises determining, at the operating system, an animation path for each of the plurality of elements wherein the animation parameters comprise an element order indicating an order on which the elements are going to be animated, and wherein the animation parameters comprises a pass time for at least one element of the plurality of elements wherein the pass time indicates a difference between an animation end time of said element and an animation begin time of the next element wherein the next element is determined based on the element order and wherein the pass time is based on a distance between said element and the next element and/or a relation between a direction of said element and a direction of the next element. In that way, the lifting of a pen to continue at a different spot, compared to where the last stroke ended, can be simulated.

Figure 18:
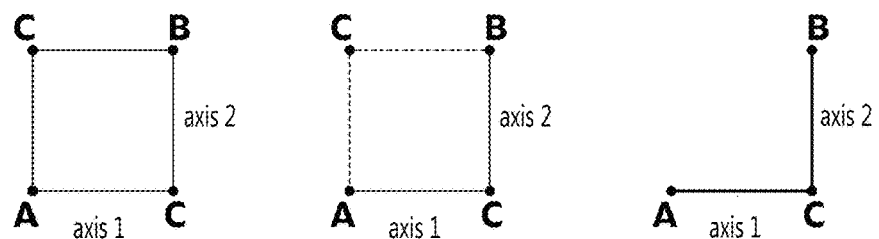
FIGS. 18, 19 and 20 illustrate the virtual HOI space.
Figure 19:
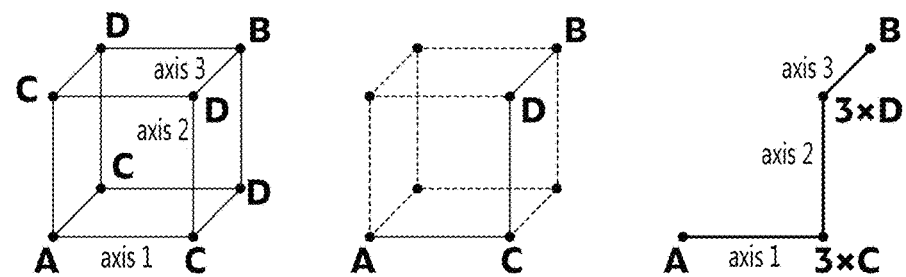
Figure 20:
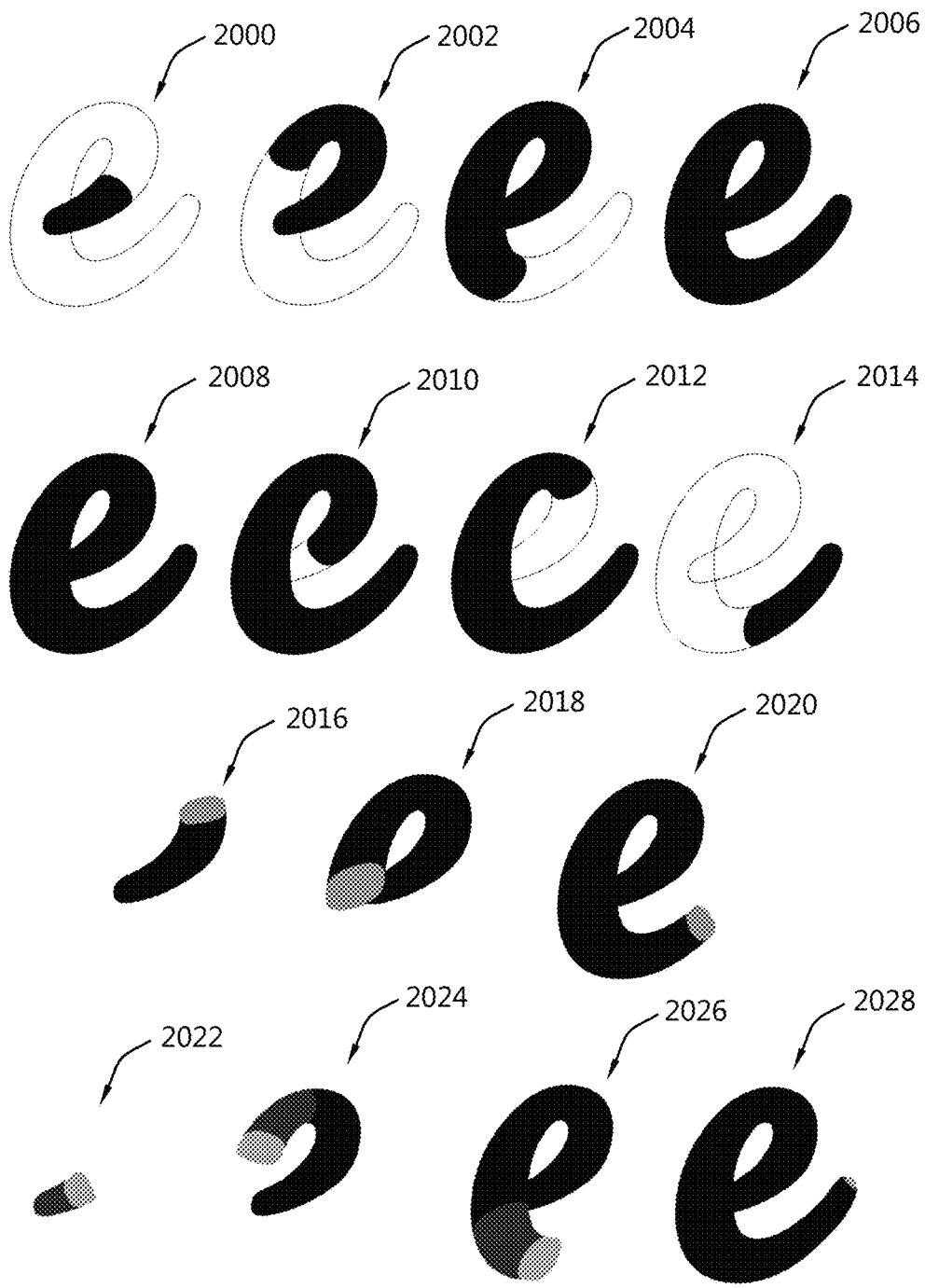

FIGS. 18, 19 and 20 illustrate the virtual HOI space. FIG. 20 shows a cubic curve defined by four points: A, C, D, B wherein A is the starting point located at coordinates (0,0), B is the ending point located at coordinates (500, 0), C is the first control point located at coordinates (0, 200) and D is the second control point located at coordinates (500, 200). The coordinates of A, B, C and D in FIG. 20 can be used to calculated three new values d1, d2 and d3 which can be used, for instance, in an OpenType gvar table, to move A on the curve defined my C & D to B. Here is the calculation based on points A, C, D, B:

$$d1=(C[0],C[1])$$

$$d2=(D[0]-2*C[0],D[1]-2*C[1])$$

$$d3=(B[0]-3*(D[0]-C[0]),B[1]-3*(D[1]-C[1]))$$

So based on FIG. 20 where A=(0,0) C=(0,200) D=(500, 200) B=(500,0) we get the following values: d1=(0,200), d2=(500, -200), d3=(-1000,0). In the HOT space, d1=C, d2=D and d3=B.

```
VHOI notation (requiring only 3 tuples):
<tuple>
    <coord axis="axis1" value="1">
    <pt A delta = d1 * 3>
</tuple>
<tuple>
    <coord axis="axis1" value="1">
    <coord axis="axis2" value="1">
    <pt A delta = d2 * 3>
</tuple>
<tuple>
    <coord axis="axis1" value="1">
    <coord axis="axis2" value="1">
    <coord axis="axis2" value="1">
    <pt A delta = d3>
</tuple>
Normal notation (requiring 7 tuples):
<tuple>
    <coord axis="axis1" value="1">
    <pt A delta = d1>
</tuple>
<tuple>
```

-continued

```
      <coord axis="axis2" value="1">
      <pt A delta = d1>
   </tuple>
   <tuple>
      <coord axis="axis3" value="1">
      <pt A delta = d1>
   </tuple>
   <tuple>
      <coord axis="axis1" value="1">
      <coord axis="axis2" value="1">
      <pt A delta = d2>
   </tuple>
   <tuple>
      <coord axis="axis1" value="1">
      <coord axis="axis3" value="1">
      <pt A delta = d2>
   </tuple>
   <tuple>
      <coord axis="axis2" value="1">
      <coord axis="axis3" value="1">
      <pt A delta = d2>
   </tuple>
   <tuple>
      <coord axis="axis1" value="1">
      <coord axis="axis2" value="1">
      <coord axis="axis2" value="1">
      <pt A delta = d3>
   </tuple>
```

Figure 21:
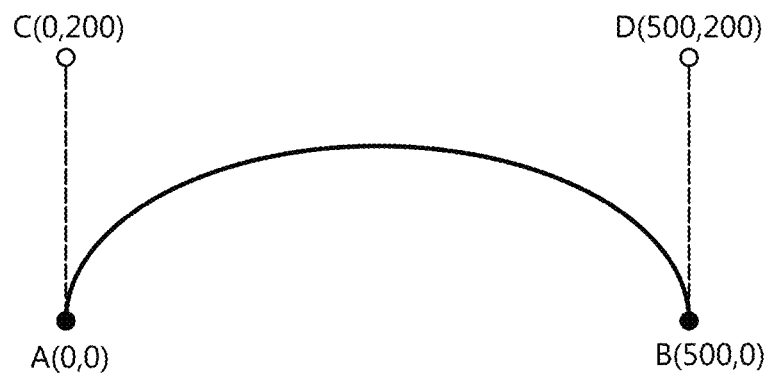
FIG. 21 shows a cubic curve defined by four points.
Figure 22A:
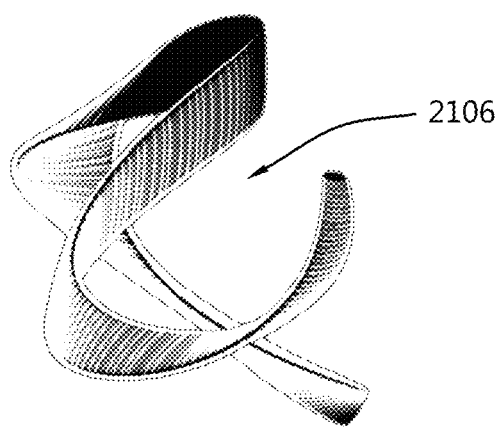
FIGS. 22A and 22B illustrates a different embodiment comprising data for animating a graphical objects.
Figure 22B:
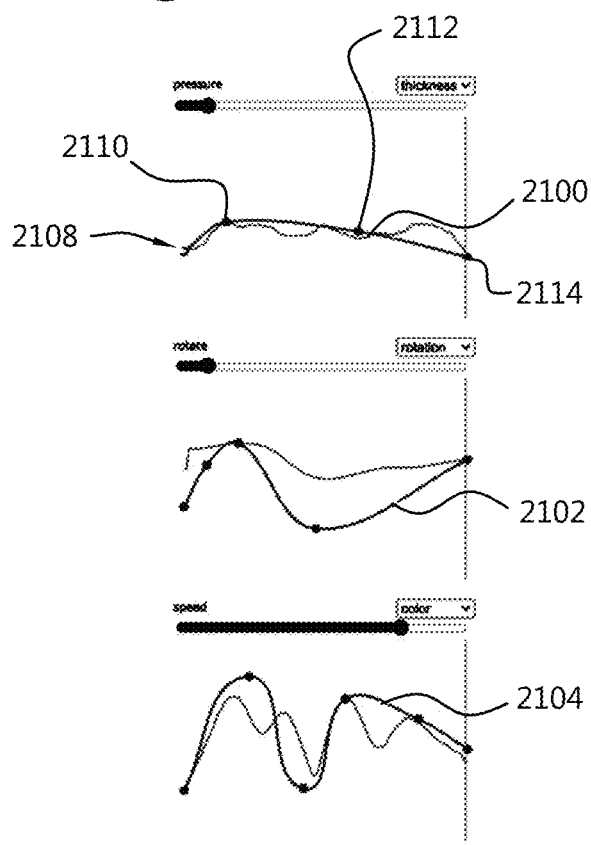

FIGS. 21, 22A and 22B illustrate a different embodiment comprising data for animating a graphical objects. The idea is to store in memory 104 multiple one dimensional trajectory based graphical data that can be used alone or together to animate the graphical object. In this way, a more general approach to trajectory based animation of glyphs (or any other visual form) is obtained, whereby more than two one dimensional trajectories (like a traditional x/y based trajectory) are merged. This allows drawing methods beyond those which are possible with contour based and or outline based graphical objects (like a glyph drawn with a bezier curve) as it has been previously explained with regard to other figures wherein the animation is based on interpolating points on the trajectory that defines the contour or shape of the graphical object. Instead of manipulating existing points on a contour, one dimensional trajectory data can be used. It could be, for instance, linked to a virtual pen, whereby the different dimensions of the one dimensional trajectory data is mapped to different properties of the virtual pen. Processing the one dimensional trajectory data in time (whereby the data is mapped to the properties of the pen), can create a richer and more complex writing animation like for example chinese calligraphy (whereby a pen changes in width, height, form and rotation parallel). This is shown in FIGS. 22A and 22B wherein a traditional two dimensional trajectory (consisting out of x/y coordinates in relation to time) is complimented with first one dimensional trajectory data 2100 representing thickness variation of the contour of the graphical object over time (a first value 2108 represents a thickness value at a first animation time, a second value 2110 represents a thickness value at a second animation time, a third value 2112 represents a thickness value at a third animation time, and a fourth value 2114 represents a thickness value at a fourth animation time,) during the animation, a second one dimensional trajectory data 2102 representing rotation variation of the contour of the graphical object over time during the animation, and a third one dimensional trajectory data 2104 representing color variation over time during the animation. The kind of animations explained with respect to FIGS. 22A and 22B can be called Trajectory Oriented Figuration (TOF). The one dimensional trajectory data may be stored in memory in any suitable way. Other one dimensional trajectory data may be used representing, for instance, width variation or speed variation. Any suitable number of the one dimensional trajectories may be applied for one animation.

Figure 23:
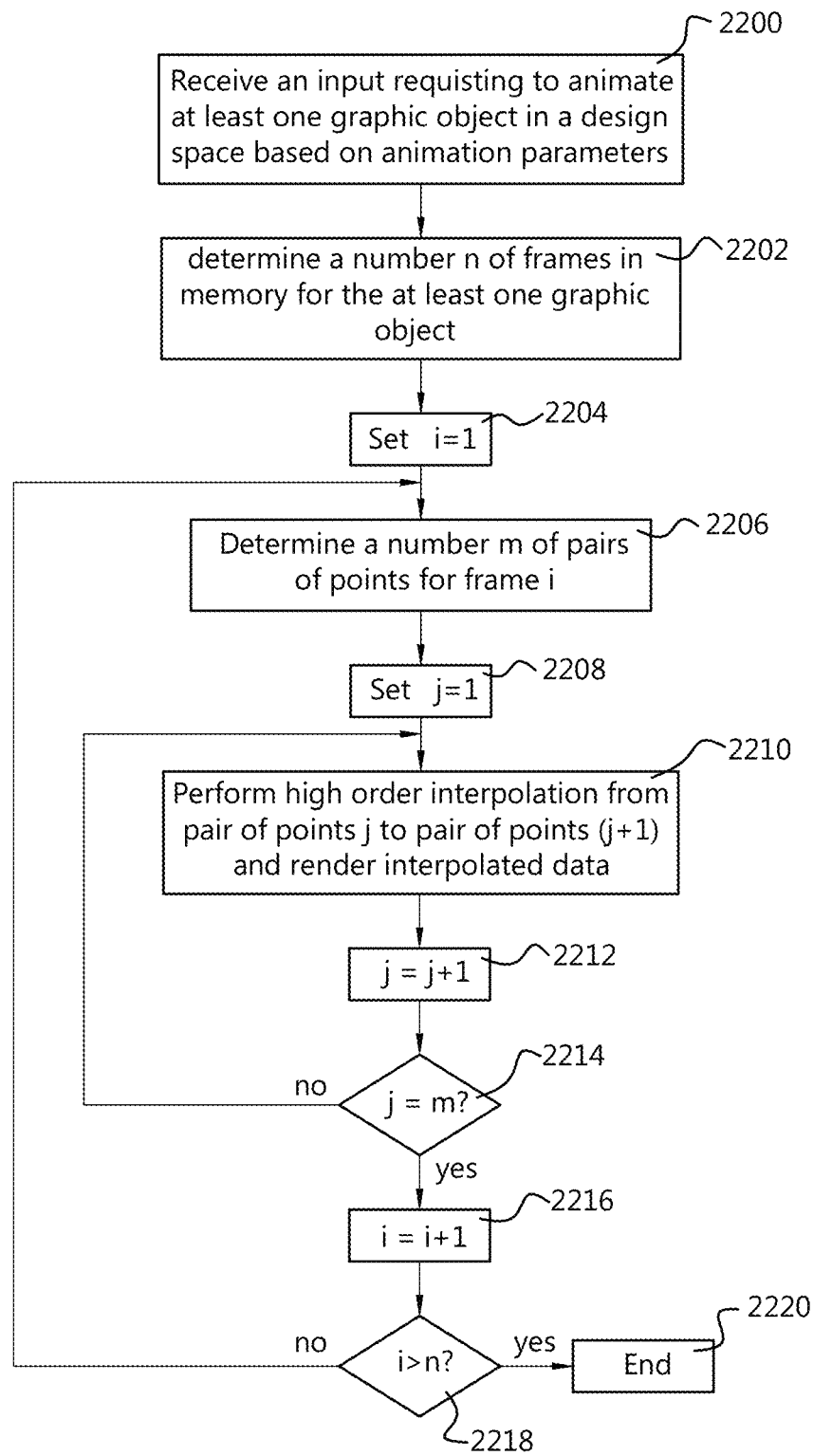
FIG. 23 illustrates a method for animating a graphical object according to an embodiment.

FIG. 23 illustrates a method for animating a graphical object according to an embodiment. In step 2200 of the method, an input requesting to animate at least one graphic object in a design space based on animation parameters is received at the operating system 108 of FIG. 1. In step 2202 of FIG. 23, a number n of frames of at least one graphic object is determined at the operating system, wherein said number of frames are stored in memory 104. In step 2204, a first counter i is started at an initial value of, for instance, one. In step 2206, it is determined a number m of pairs of points in the frame number i. In step 2208, a second counter j is started at an initial value of, for instance 2208. In step 2210, the operating system executed in the processor 106 performs a high order interpolation by interpolating the j-th pair of points to the (j+1)-th pair of points and rendering the interpolated data. In step 2212, the first counter is updated by adding one to its previous value. Step 2214 checks whether the last pair of points of the frame currently being processed has been interpolated. If the value of first counter j is not equal to m, then the method proceeds to step 2210 wherein a new pair of points is processed. If the value of the first counter j is m, then the method proceeds to step 2216 wherein the second counter value j is updated by adding one to its previous value. In step 2218, if I is greater than n, the method ends as all the frames have been animated. I If the value of first counter j is not equal to m, then the method proceeds to step 2206 wherein a new frame is processed.

Figure 24A:
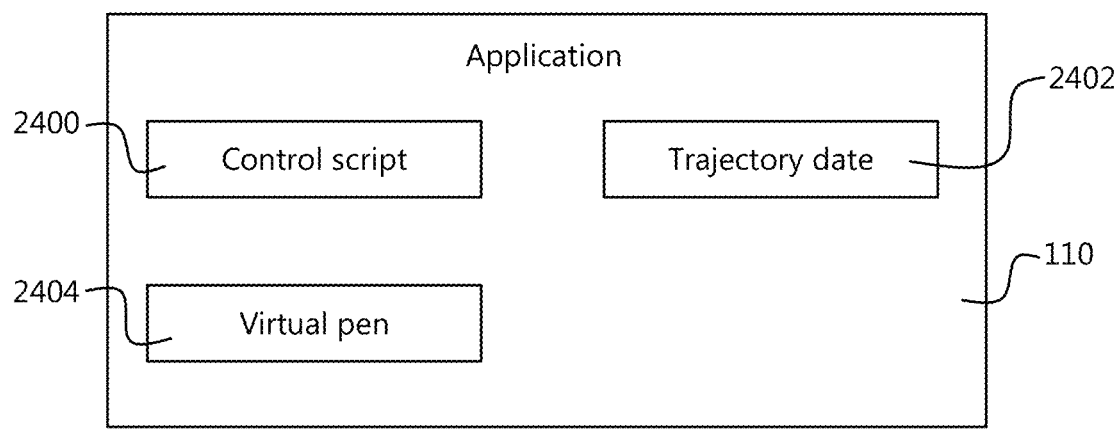
FIGS. 24A and 24B illustrate a schematic block diagram of an example device according to an implementation of the present disclosure.
Figure 24B:
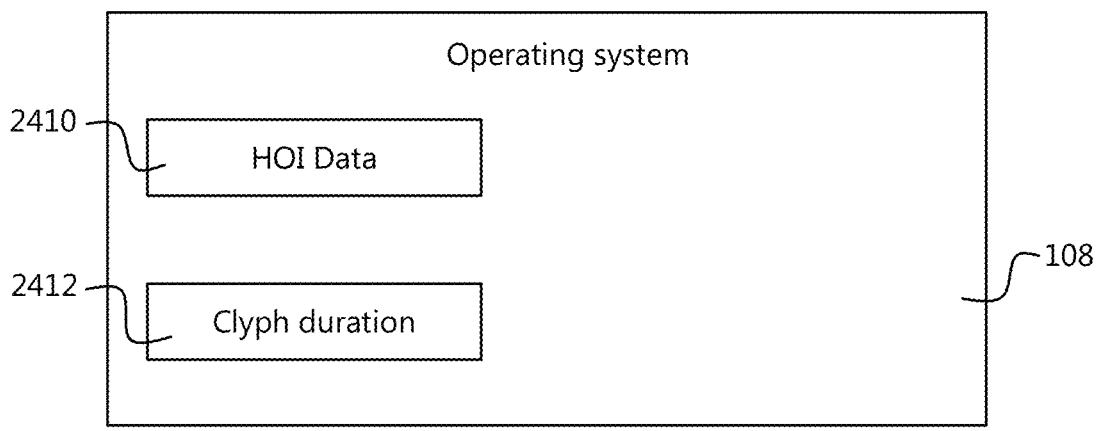

FIGS. 24A and 24B illustrate a schematic block diagram of an example device according to an implementation of the present disclosure.

The operating system 108 may comprise HOI data 2410 to be used to perform the HOI interpolation, and may comprise glyph duration data 2412 indicating which frame should be animated and when. The application 110 may comprise control script block 2400 that uses the HOI data 2410 and the glyph duration data 2412. The application 110 may comprise also the trajectory data 2402. The application 110 may comprise a virtual pen 2404. The virtual pen 2400 may comprise data to be used to animate the graphical object. However, in another embodiment, the application 110 may not comprise a virtual pen.

Clauses:
 1. A computer-implemented method for animating a graphical object based on animation parameters, the graphical object comprising at least one element wherein the at least one element comprises at least one frame wherein the at least one frame comprises a trajectory defining at least a part of the shape of the graphical object wherein the trajectory comprises a first side and a second side, and the at least one frame comprises a plurality of pairs of points where each pair of points comprises a first point located on the first side of the trajectory and a second point located on the second side of the trajectory, and wherein animating the graphical object comprises:
    receiving, at an operating system executing on a computer device, a request to animate a graphical object in a design space based on one or more animation parameters;
    determining, at the operating system, an animation path for the frame in the design space by determining a moving path from a first pair of the plurality of pairs of points of the frame to a second pair of the plurality of pairs of points of the frame wherein the first and second points of the second pair are respectively neighbours of the first and second points of the first pair of points; and displaying the animation path on a display.

2. The computer-implemented method of clause 1 wherein the graphical object comprises a glyph, a pictogram icon or a vector-based drawing, and the at least one elements comprises a stroke.

3. The computer-implemented method of clause 1 wherein determining the moving path comprises respectively applying, at the operating system, a higher order interpolation to the first and second points of the pair of points based on a plurality of off-curve points located out of the trajectory of the element; wherein the design space for one of the higher order interpolations comprises at least one of the two off-curve points twice.

4. The computer-implemented method of clause 3 wherein at least one of the plurality of off-curve points is determined by applying at the operating system a higher order interpolation to another one of the plurality of off-curve points.

5. The computer-implemented method according to any of the preceding clauses, wherein the animation parameters comprise at least one of an element speed, an element direction and an element curvature and wherein animating the graphical object comprises determining, at the operating system, an animation speed based on at least one of the element speed, the element direction and the element curvature.

6. The computer-implemented method according to any of the preceding clauses, wherein the animated graphical object comprises a plurality of elements each one defining the shape of the graphical object and wherein generating the animated graphical object comprises determining, at the operating system, an animation path for each of the plurality of elements wherein the animation parameters comprise an element order indicating an order on which the elements are going to be animated.

7. The computer-implemented method of clause 6, wherein the animation parameters comprises a pass time for at least one element of the plurality of elements wherein the pass time indicates a difference between an animation end time of said element and an animation begin time of the next element wherein the next element is determined based on the element order and wherein the pass time is based on a distance between said element and the next element and/or a relation between a direction of said element and a direction of the next element.

8. The computer-implemented method of clause 1, wherein the at least one element comprises a last frame comprising an ending point.

9. The computer-implemented method of clause 1, wherein the at least one element comprises an initial frame comprising a starting point.

10. The computer-implemented method according to any of the preceding clauses, wherein the element comprises at least two frames and wherein animating the graphical object comprises determining, at the operating system, the animation path in the design space for each of the two frames wherein each of the two frames is rendered from a memory.

11. The computer-implemented method according to any of the preceding clauses, wherein the element comprises at least two frames and animating the graphic object comprises rendering a first frame from a memory, determining, at the operating system, a first animation path in a first design space for the first frame, and determining a second animation path in a second design space for the second frame wherein the animation path for the second frame is determined by starting from the first frame.

12. The computer-implemented method according to clause 11, wherein the second design space comprises a first, a second and a third interpolation wherein each interpolation comprises a starting animation time, an ending animation time and a maximum animation time wherein the starting animation time of the second and the third interpolations is equal to the starting animation time of the first interpolation, the ending animation time of the second and third interpolations is equal to the ending animation time of the first interpolation, the maximum animation time of the second interpolation time is equal to the starting animation time of the second interpolation and the maximum animation time of the third interpolation time is equal to the ending animation time of the third interpolation.

13. A computer-implemented method for animating a graphical object based on animation parameters, the graphical object comprising at least one element wherein the at least one element comprises at least a one dimensional trajectory corresponding and mapped to different properties of a virtual pen comprising at least one frame defining at least a part of the shape of the graphical object wherein the frame comprises a first side and a second side, and the at least one frame comprises a plurality of pairs of points where each pair of points comprises a first point located on the first side of the frame and a second point located on the second side of the frame, and wherein animating the graphical object comprises:

receiving, at an operating system executing on a computer device, a request to animate a graphical object in a design space based on one or more animation parameters;

determining, at the operating system, an animation path for the frame in the design space by determining a moving path from a first pair of the plurality of pairs of points of the frame to a second pair of the plurality of pairs of points of the frame wherein the first and second points of the second pair are respectively neighbours of the first and second points of the first pair of points; and displaying the animation path on a display.

14. The computer-implemented method according to any of the preceding clauses, wherein the element further comprises a trajectory with n 1-dimensional trajectories corresponding and mapped to the properties of a virtual pen.

15. The computer-implemented method according to clause 13, wherein the animation parameter comprises at least one weight adjustment value corresponding to one of the plurality of width values.

16. The computer-implemented method according clause 3, wherein the animation parameter comprises an interpolation speed parameter wherein the animation path is displayed based on the interpolation speed parameter.

17. The computer-implemented method according to any of the preceding clauses, wherein the animation parameters further comprise a plurality of pressure values received via a pressure sensor wherein each of the pressure values is associated with a 2 dimensional coordinate in an area of the pressure sensor.

18. The computer-implemented method according to clause 3, wherein the interpolation order of the first point is different than the interpolation order of the second point.

19. A computer device for animating a graphical object based on animation parameters, the graphical object comprising at least one element wherein the at least one element comprises at least one frame wherein the at least one frame comprises a trajectory defining at least a part of the shape of the graphical object wherein the trajectory comprises a first side and a second side, and the at least one frame comprises a plurality of pairs of points where each pair of points comprises a first point located on the first side of the trajectory and a second point located on the second side of the trajectory, the computer device comprising:
a memory to store data and instructions;
a processor to communicate with the memory;
a display; and
an operating system to communicate with the memory and the processor;
wherein the operating system is operable to:
receive a request to animate a graphical object in a design space based on one or more animation parameters;
determine an animation path for the frame in the design space by determining a moving path from a first pair of the plurality of pairs of points of the frame to a second pair of the plurality of pairs of points of the frame wherein the first and second points of the second pair are respectively neighbours of the first and second points of the first pair of points; and
display the animation path on the display.

20. The computer device of clause 18 wherein the graphical object comprises a glyph, a pictogram icon or a vector-based drawing, and the at least one elements comprises a stroke.

21. The computer device of clause 18 wherein the operating system is further operable to determining the moving path comprises by respectively applying a higher order interpolation to the first and second points of the pair of points based on a plurality of off-curve points located out of the trajectory of the element; wherein the design space for one of the higher order interpolations comprises at least one of the two off-curve points twice.

22. The computer device of clause 20 wherein at least one of the plurality of off-curve points is determined by applying at the operating system a higher order interpolation to another one of the plurality of off-curve points.

23. The computer device according to any of clauses 18-21, wherein the animation parameters comprise at least one of an element speed, an element direction and an element curvature and wherein animating the graphical object comprises determining, at the operating system, an animation speed based on at least one of the element speed, the element direction and the element curvature.

24. The computer device according to any of clauses 18-22, wherein the animated graphical object comprises a plurality of elements each one defining the shape of the graphical object and wherein generating the animated graphical object comprises determining, at the operating system, an animation path for each of the plurality of elements wherein the animation parameters comprise an element order indicating an order on which the elements are going to be animated.

25. The computer device of clause 23, wherein the animation parameters comprises a pass time for at least one element of the plurality of elements wherein the pass time indicates a difference between an animation end time of said element and an animation begin time of the next element wherein the next element is determined based on the element order and wherein the pass time is based on a distance between said element and the next element and/or a relation between a direction of said element and a direction of the next element.

26. The computer device of clause 18, wherein the at least one element comprises a last frame comprising an ending point.

27. The computer device of clause 18, wherein the at least one element comprises an initial frame comprising a starting point.

28. The computer device according to any of clauses 18-26, wherein the element comprises at least two frames and wherein animating the graphical object comprises determining, at the operating system, the animation path in the design space for each of the two frames wherein each of the two frames is rendered from a memory.

29. The computer device according to any of clauses 18-27, wherein the element comprises at least two frames and animating the graphic object comprises rendering a first frame from a memory, determining, at the operating system, a first animation path in a first design space for the first frame, and determining a second animation path in a second design space for the second frame wherein the animation path for the second frame is determined by starting from the first frame.

30. The computer device according to clause 28, wherein the second design space comprises a first, a second and a third interpolation wherein each interpolation comprises a starting animation time, an ending animation time and a maximum animation time wherein the starting animation time of the second and the third interpolations is equal to the starting animation time of the first interpolation, the ending animation time of the second and third interpolations is equal to the ending animation time of the first interpolation, the maximum animation time of the second interpolation time is equal to the starting animation time of the second interpolation and the maximum animation time of the third interpolation time is equal to the ending animation time of the third interpolation.

31. A computer device configured to perform the method of clause 13.

32. The computer device according to clause 30, wherein the animation parameter comprises at least one weight adjustment value corresponding to one of the plurality of width values.

33. The computer device according clause 20, wherein the animation parameter comprises an interpolation speed parameter wherein the animation path is displayed based on the interpolation speed parameter.

34. The computer device according to any of clauses 18-32, wherein the animation parameters further comprise a plurality of pressure values received via a pressure sensor wherein each of the pressure values is associated with a 2 dimensional coordinate in an area of the pressure sensor.

35. The computer device according of clause 20, wherein the interpolation order of the first point is different than the interpolation order of the second point.

36. A non-transitory computer-readable medium storing instructions for animating a graphical object based on animation parameters, the graphical object comprising at least one element wherein the at least one element comprises at least one frame wherein the at least one frame comprises a trajectory defining at least a part of the shape of the graphical object wherein the trajectory comprises a first side and a second side, and the at least one frame comprises a plurality of pairs of points where each pair of points comprises a first point located on the first side of the trajectory and a second point located on the second side of the trajectory, and instructions being executable by a computer device and comprising:

at least one instruction for causing the computer device to receive a request to animate a graphical object in a design space based on one or more animation parameters;

at least one instruction for causing the computer device to determine an animation path for the frame in the design space by determining a moving path from a first pair of the plurality of pairs of points of the frame to a second pair of the plurality of pairs of points of the frame wherein the first and second points of the second pair are respectively neighbours of the first and second points of the first pair of points; and at least one instruction for causing the computer device to display the animation path.

37. The non-transitory computer-readable medium of clause 35 wherein the graphical object comprises a glyph, a pictogram icon or a vector-based drawing, and the at least one elements comprises a stroke.

38. The non-transitory computer-readable medium of clause 35 further comprising:

at least one instruction causing the computer device to determine the moving path by respectively applying a higher order interpolation to the first and second points of the pair of points based on a plurality of off-curve points located out of the trajectory of the element; wherein the design space for one of the higher order interpolations comprises at least one of the two off-curve points twice.

39. The non-transitory computer-readable medium of clause 37 wherein at least one of the plurality of off-curve points is determined by applying a higher order interpolation to another one of the plurality of off-curve points.

40. The non-transitory computer-readable medium according to any of clauses 35-38, wherein the animation parameters comprise at least one of an element speed, an element direction and an element curvature and wherein animating the graphical object comprises determining, at the operating system, an animation speed based on at least one of the element speed, the element direction and the element curvature.

41. The non-transitory computer-readable medium according to any of clauses 35-39, wherein the animated graphical object comprises a plurality of elements each one defining the shape of the graphical object and wherein generating the animated graphical object comprises determining an animation path for each of the plurality of elements wherein the animation parameters comprise an element order indicating an order on which the elements are going to be animated.

42. The non-transitory computer-readable medium of clause 40, wherein the animation parameters comprises a pass time for at least one element of the plurality of elements wherein the pass time indicates a difference between an animation end time of said element and an animation begin time of the next element wherein the next element is determined based on the element order and wherein the pass time is based on a distance between said element and the next element and/or a relation between a direction of said element and a direction of the next element.

43. The non-transitory computer-readable medium of clause 351, wherein the at least one element comprises a last frame comprising an ending point.

44. The non-transitory computer-readable medium of clause 35, wherein the at least one element comprises an initial frame comprising a starting point.

45. The non-transitory computer-readable medium according to any of clauses 35-43, wherein the element comprises at least two frames and wherein animating the graphical object comprises determining the animation path in the design space for each of the two frames wherein each of the two frames is rendered from a memory.

46. The non-transitory computer-readable medium according to any of clauses 35-44, wherein the element comprises at least two frames and animating the graphic object comprises rendering a first frame from a memory, determining a first animation path in a first design space for the first frame, and determining a second animation path in a second design space for the second frame wherein the animation path for the second frame is determined by starting from the first frame.

47. The non-transitory computer-readable medium according to clause 45, wherein the second design space comprises a first, a second and a third interpolation wherein each interpolation comprises a starting animation time, an ending animation time and a maximum animation time wherein the starting animation time of the second and the third interpolations is equal to the starting animation time of the first interpolation, the ending animation time of the second and third interpolations is equal to the ending animation time of the first interpolation, the maximum animation time of the second interpolation time is equal to the starting animation time of the second interpolation and the maximum animation time of the third interpolation time is equal to the ending animation time of the third interpolation.

48. A non-transitory computer-readable medium comprising instructions to implement the method of clause 13.

49. The non-transitory computer-readable medium according to clause 47, wherein the animation parameter comprises at least one weight adjustment value corresponding to one of the plurality of width values.

50. The non-transitory computer-readable medium according clause 37, wherein the animation parameter comprises an interpolation speed parameter wherein the animation path is displayed based on the interpolation speed parameter.

51. The non-transitory computer-readable medium according to any of clauses 35-49, wherein the animation parameters further comprise a plurality of pressure values received via a pressure sensor wherein each of the pressure values is associated with a two dimensional coordinate in an area of the pressure sensor.

52. The non-transitory computer-readable medium according of clause 37, wherein the interpolation order of the first point is different than the interpolation order of the second point.

The examples and embodiments described herein serve to illustrate rather than limit the invention. The person skilled in the art will be able to design alternative embodiments without departing from the scope of the claims. Reference signs placed in parentheses in the claims shall not be interpreted to limit the scope of the claims. Items described as separate entities in the claims or the description may be implemented as a single hardware or software item combining the features of the items described.

The invention claimed is:

1. A computer-implemented method for animating a graphical object based on one or more animation parameters, the graphical object comprising at least one element wherein the at least one element comprises at least one frame wherein the at least one frame comprises a contour defining at least a part of the shape of the graphical object wherein the contour comprises a first side and a second side, and the at least one frame comprises a plurality of pairs of points where each pair of points comprises a first point located on the first side of the contour and a second point located on the second side of the contour, and wherein animating the graphical object comprises:

receiving, at an operating system executing on a computer device, a request to animate the graphical object in a design space based on the one or more animation parameters;

determining, at the operating system, an animation path for the at least one frame in the design space by determining a moving path from a first pair of the plurality of pairs of points of the at least one frame to a second pair of the plurality of pairs of points of the at least one frame wherein the first and second points of the second pair are respectively neighbours of the first and second points of the first pair of points; and displaying the animation path on a display, wherein displaying the animation path includes interpolating between each of the plurality of pairs of points along the moving path.

2. The computer-implemented method of claim 1 wherein the graphical object comprises a glyph, a pictogram icon or a vector-based drawing, and the at least one elements comprises a stroke.

3. The computer-implemented method of claim 1 wherein determining the moving path comprises respectively applying, at the operating system, a higher order interpolation to the first and second points of the pair of points based on a plurality of off-curve points located out of the contour of the at least one element; wherein the design space for one of the higher order interpolations comprises at least one of the two off-curve points twice.

4. The computer-implemented method of claim 3 wherein at least one of the plurality of off-curve points is determined by applying at the operating system a higher order interpolation to another one of the plurality of off-curve points.

5. The computer-implemented method according to claim 1, wherein the one or more animation parameters comprise at least one of an element speed, an element direction and an element curvature and wherein animating the graphical object comprises determining, at the operating system, an animation speed based on at least one of the element speed, the element direction and the element curvature.

6. The computer-implemented method according to claim 1, wherein the animated graphical object comprises a plurality of elements each one defining the shape of the graphical object and wherein generating the animated graphical object comprises determining, at the operating system, an animation path for each of the plurality of elements wherein the one or more animation parameters comprise an element order indicating an order on which the elements are going to be animated.

7. The computer-implemented method of claim 6, wherein the one or more animation parameters comprises a pass time for at least one element of the plurality of elements wherein the pass time indicates a difference between an animation end time of said element and an animation begin time of the next element wherein the next element is determined based on the element order and wherein the pass time is based on a distance between said element and the next element and/or a relation between a direction of said element and a direction of the next element.

8. The computer-implemented method of claim 1, wherein the at least one element comprises a last frame comprising an ending point and/or an initial frame comprising a starting point.

9. The computer-implemented method according to claim 1, wherein the element comprises at least two frames and wherein animating the graphical object comprises determining, at the operating system, the animation path in the design space for each of the two frames wherein each of the two frames is rendered from a memory.

10. The computer-implemented method according to claim 1, wherein the element comprises at least two frames and animating the graphic object comprises rendering a first frame from a memory, determining, at the operating system, a first animation path in a first design space for the first frame, and determining a second animation path in a second design space for the second frame wherein the animation path for the second frame is determined by starting from the first frame.

11. The computer-implemented method according to claim 10, wherein the second design space comprises a first, a second and a third interpolation wherein each interpolation comprises a starting animation time, an ending animation time and a maximum animation time wherein the starting animation time of the second and the third interpolations is equal to the starting animation time of the first interpolation, the ending animation time of the second and third interpolations is equal to the ending animation time of the first interpolation, the maximum animation time of the second interpolation time is equal to the starting animation time of the second interpolation and the maximum animation time of the third interpolation time is equal to the ending animation time of the third interpolation.

12. A computer-implemented method for animating a graphical object based on one or more animation parameters, the graphical object comprising at least one element wherein the at least one element comprises at least a one dimensional contour corresponding and mapped to different properties of a virtual pen comprising at least one frame defining at least a part of the shape of the graphical object wherein the at least one frame comprises a first side and a second side, and the at least one frame comprises a plurality of pairs of points where each pair of points comprises a first point located on the first side of the at least one frame and a second point located on the second side of the at least one frame, and wherein animating the graphical object comprises:

Receiving, at an operating system executing on a computer device, a request to animate the graphical object in a design space based on the one or more animation parameters;

determining, at the operating system, an animation path for the at least one frame in the design space by determining a moving path from a first pair of the plurality of pairs of points of the at least one frame to a second pair of the plurality of pairs of points of the at least one frame wherein the first and second points of the second pair are respectively neighbours of the first and second points of the first pair of points; and displaying the animation path on a display, wherein displaying the animation path includes interpolating between each of the plurality of pairs of points along the moving path.

13. The computer-implemented method according to claim 12, wherein the animation parameter comprises at least one weight adjustment value corresponding to one of the plurality of width values.

14. A computer device for animating a graphical object based on one or more animation parameters, the graphical object comprising at least one element wherein the at least one element comprises at least one frame wherein the at least one frame comprises a contour defining at least a part of the shape of the graphical object wherein the contour comprises a first side and a second side, and the at least one frame comprises a plurality of pairs of points where each pair of points comprises a first point located on the first side of the contour and a second point located on the second side of the contour, the computer device comprising:
 a memory to store data and instructions;
 a processor to communicate with the memory;
 a display; and
 an operating system to communicate with the memory and the processor;
 wherein the operating system is operable to:
  receive a request to animate the graphical object in a design space based on one or more animation parameters;
  determine an animation path for the at least one frame in the design space by determining a moving path from a first pair of the plurality of pairs of points of the at least one frame to a second pair of the plurality of pairs of points of the at least one frame wherein the first and second points of the second pair are respectively neighbours of the first and second points of the first pair of points; and
  display the animation path on the display, wherein displaying the animation path includes interpolating between each of the plurality of pairs of points along the moving path.

15. The computer device of claim 14 wherein the graphical object comprises a glyph, a pictogram icon or a vector-based drawing, and the at least one elements comprises a stroke.

16. The computer device of claim 14 wherein the operating system is further operable to determining the moving path comprises by respectively applying a higher order interpolation to the first and second points of the pair of points based on a plurality of off-curve points located out of the contour of the element; wherein the design space for one of the higher order interpolations comprises at least one of the two off-curve points twice.

17. The computer device of claim 16 wherein at least one of the plurality of off-curve points is determined by applying at the operating system a higher order interpolation to another one of the plurality of off-curve points.

18. The computer device according to claim 14, wherein the one or more animation parameters comprise at least one of an element speed, an element direction and an element curvature and wherein animating the graphical object comprises determining, at the operating system, an animation speed based on at least one of the element speed, the element direction and the element curvature.

19. The computer device according to claim 14, wherein the animated graphical object comprises a plurality of elements each one defining the shape of the graphical object and wherein generating the animated graphical object comprises determining, at the operating system, an animation path for each of the plurality of elements wherein the one or more animation parameters comprise an element order indicating an order on which the elements are going to be animated.

20. The computer device of claim 19, wherein the one or more animation parameters comprises a pass time for at least one element of the plurality of elements wherein the pass time indicates a difference between an animation end time of said element and an animation begin time of the next element wherein the next element is determined based on the element order and wherein the pass time is based on a distance between said element and the next element and/or a relation between a direction of said element and a direction of the next element.

* * * * *